United States Patent
Stenerhag et al.

(10) Patent No.: US 12,071,336 B2
(45) Date of Patent: Aug. 27, 2024

(54) BEVERAGE DISPENSING PREVENTION

(71) Applicant: WayOut International AB, Stockholm (SE)

(72) Inventors: Ulf Stenerhag, Varmdo (SE); Mattias Liss, Jarfalla (SE); Martin Renck, Stockholm (SE); Niclas Emdelius, Saltsjo-Boo (SE)

(73) Assignee: Wayout International AB, Stockholm (SE)

( * ) Notice: Subject to any disclaimer, the term of this patent is extended or adjusted under 35 U.S.C. 154(b) by 0 days.

(21) Appl. No.: 18/258,216

(22) PCT Filed: Dec. 22, 2021

(86) PCT No.: PCT/EP2021/087388
§ 371 (c)(1),
(2) Date: Jun. 19, 2023

(87) PCT Pub. No.: WO2022/136595
PCT Pub. Date: Jun. 30, 2022

(65) Prior Publication Data
US 2024/0002209 A1  Jan. 4, 2024

(30) Foreign Application Priority Data

Dec. 22, 2020 (SE) .................................... 2051540-9
Dec. 22, 2020 (SE) .................................... 2051541-7
(Continued)

(51) Int. Cl.
*B67D 1/08* (2006.01)
*B67D 1/00* (2006.01)
(Continued)

(52) U.S. Cl.
CPC ......... *B67D 1/0882* (2013.01); *B67D 1/0004* (2013.01); *B67D 1/0801* (2013.01);
(Continued)

(58) Field of Classification Search
CPC .. B67D 1/0882; B67D 1/0801; B67D 1/0888; B67D 2001/0811
See application file for complete search history.

(56) References Cited

U.S. PATENT DOCUMENTS

| | | | |
|---|---|---|---|
| 5,896,899 | A | 4/1999 | Schmitz |
| 8,819,498 | B2 | 8/2014 | Gearing et al. |

(Continued)

FOREIGN PATENT DOCUMENTS

| | | |
|---|---|---|
| CA | 2928939 A1 | 10/2017 |
| EP | 2940538 A2 | 11/2015 |

(Continued)

OTHER PUBLICATIONS

International Search Report & Written Opinion dated May 16, 2022, European Patent Office, Rijswijk, Netherlands.
(Continued)

*Primary Examiner* — Donnell A Long
(74) *Attorney, Agent, or Firm* — Noréns Patentbyrå AB

(57) ABSTRACT

There is provided a system comprising a plurality of reusable and portable beverage containers the system further comprising at least one beverage dispensing station adapted to support one of the beverage containers, and connect to the beverage container such that beverage can be dispensed from the container, said beverage dispensing station comprising an identity tag reader configured to read the identity tag of a beverage container, said beverage dispensing station further comprising a wireless network interface, where the beverage dispensing station has dispensing prevention means which prevents a user from dispensing beverage from
(Continued)

the dispenser, the system further comprising a server in communication with the beverage dispensing station, said server having stored a dataset comprising the identities of each of the plurality of beverage containers, wherein a beverage container can be flagged, in the dataset, for activation of the be dispensing prevention means, and the system is configured to, when a beverage container is flagged for activation of the beverage dispensing prevention means, activate the dispensing prevention means of the dispensing station.

13 Claims, 12 Drawing Sheets

(30) Foreign Application Priority Data

| Dec. 22, 2020 | (SE) | 2051542-5 |
|---|---|---|
| Dec. 22, 2020 | (SE) | 2051543-3 |
| Dec. 22, 2020 | (SE) | 2051545-8 |
| Dec. 22, 2020 | (SE) | 2051546-6 |
| Dec. 22, 2020 | (SE) | 2051547-4 |

(51) Int. Cl.
*G05B 13/02* (2006.01)
*G06Q 10/0631* (2023.01)

(52) U.S. Cl.
CPC ......... *B67D 1/0871* (2013.01); *B67D 1/0888* (2013.01); *B67D 1/0891* (2013.01); *G05B 13/0265* (2013.01); *G06Q 10/06315* (2013.01); *B67D 2001/0811* (2013.01)

(56) References Cited

U.S. PATENT DOCUMENTS

| 9,542,578 | B2* | 1/2017 | Dattolo | G06K 7/10089 |
| 11,192,770 | B1* | 12/2021 | Volftsun | G06Q 20/0855 |
| 2006/0238346 | A1 | 10/2006 | Teller | |
| 2008/0059120 | A1 | 3/2008 | Xiao et al. | |
| 2011/0168775 | A1 | 7/2011 | Zetten | |
| 2012/0085071 | A1 | 4/2012 | Hahn et al. | |
| 2014/0012784 | A1 | 1/2014 | Singliar | |
| 2014/0053944 | A1 | 2/2014 | Wang | |
| 2014/0166694 | A1* | 6/2014 | Otto | B67D 1/0001 |
| | | | | 222/95 |
| 2014/0220184 | A1* | 8/2014 | Boggs | G07F 13/065 |
| | | | | 426/115 |
| 2015/0109143 | A1 | 4/2015 | Hershberger et al. | |
| 2015/0191341 | A1 | 7/2015 | Martindale et al. | |
| 2017/0132726 | A1 | 5/2017 | Parkinson, Jr. et al. | |
| 2017/0341822 | A1 | 11/2017 | Essebbar | |
| 2018/0197057 | A1 | 7/2018 | Pic | |
| 2018/0327243 | A1 | 11/2018 | Rider et al. | |
| 2019/0135501 | A1 | 5/2019 | Chandra et al. | |
| 2019/0311239 | A1 | 10/2019 | Bright | |
| 2020/0056919 | A1 | 2/2020 | Jones | |
| 2020/0172387 | A1 | 6/2020 | Hershberger et al. | |
| 2022/0185651 | A1* | 6/2022 | Bergmann | G07F 13/065 |

FOREIGN PATENT DOCUMENTS

| ES | 2724776 | A1 | 9/2019 |
| GB | 2583546 | A | 11/2020 |
| WO | 2004096694 | A1 | 11/2004 |
| WO | 2008112414 | A2 | 9/2008 |
| WO | 2015066594 | A1 | 5/2015 |
| WO | 2015101573 | A1 | 7/2015 |
| WO | 2017211890 | A1 | 12/2017 |
| WO | 2018232749 | A1 | 12/2018 |

OTHER PUBLICATIONS

International Preliminary Report on Patentability dated Oct. 28, 2022, European Patent Office, Munich, Germany.

* cited by examiner

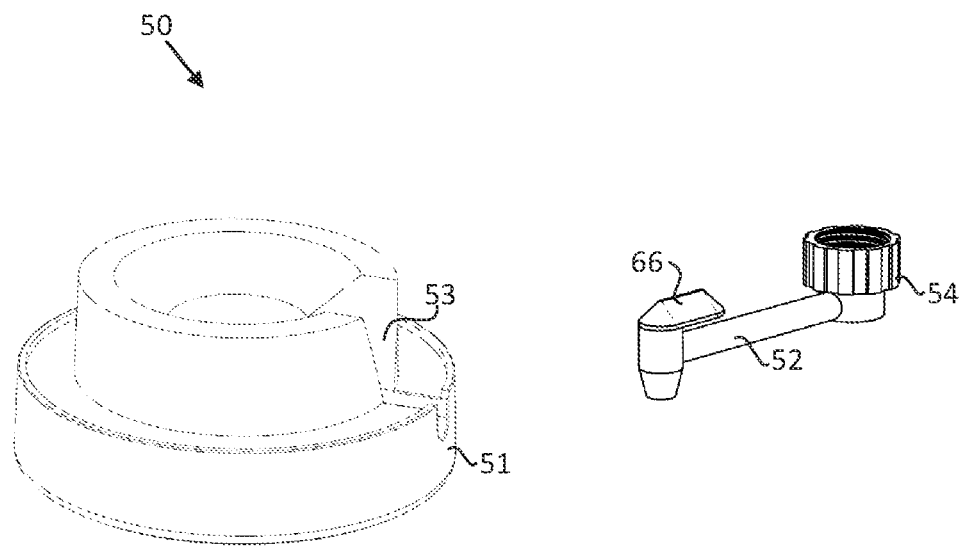
Fig. 6
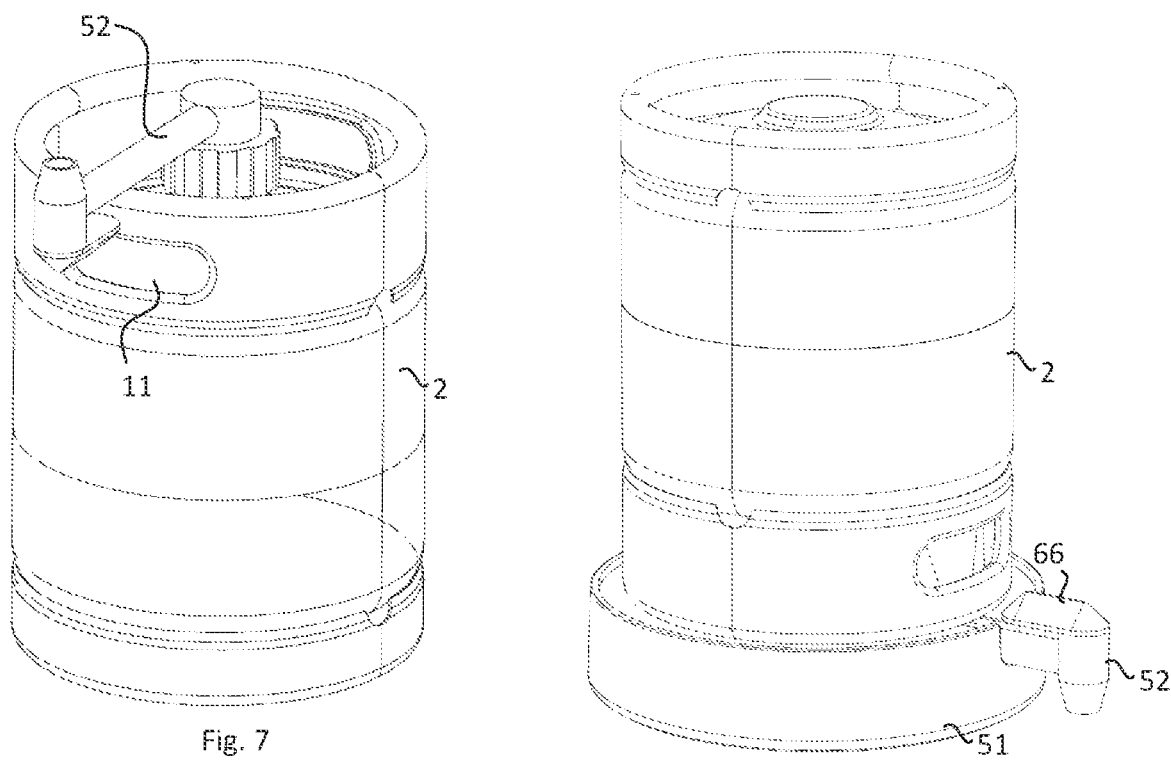
Fig. 7
Fig. 8

BEVERAGE DISPENSING PREVENTION

FIELD OF THE INVENTION

This invention relates to systems and methods for distribution of beverage, in particular using individually traceable containers.

BACKGROUND

Although centrally provided water ("tap water") is available most countries, at least in densely populated areas, the water is often not suitable for human consumption. Instead, potable water is produced and packaged (bottled) centrally and single use containers/bottles are then distributed using a fleet of trucks or other vehicles to stores, for example grocery stores, where they are available for purchase. Other beverages than water, such as beer and soda are also provided in grocery stores.

This has several drawbacks. First, because a human consumes large amounts of drinking water, it is a hassle to shop and carry the necessary amounts of drinking water (or other beverage). Moreover, single use containers need to be produced. After use, the single use containers are, at best, recycled and used as fuel in waste burning plants. At worst, single use containers becomes a part of the increasingly troubling world-wide trash problem.

SUMMARY OF INVENTION

In a first aspect of the invention there is provided a system comprising a plurality of reusable and portable beverage containers where each of the plurality of beverage containers carries a unique identification tag,
the system further comprising
at least one beverage dispensing station adapted to support one of the beverage containers, and connect to the beverage container such that beverage can be dispensed from the container, said beverage dispensing station comprising an identity tag reader configured to read the identity tag of a beverage container, said beverage dispensing station further comprising a wireless network interface,
where the beverage dispensing station has dispensing prevention means which prevents a user from dispensing beverage from the dispenser,
the system further comprising a server in communication with the beverage dispensing station, said server having stored a dataset comprising the identities of each of the plurality of beverage containers, wherein a beverage container can be flagged, in the dataset, for activation of the be dispensing prevention means, and the system is configured to, when a beverage container is flagged for activation of the beverage dispensing prevention means, activate the dispensing prevention means of the dispensing station.

The system, devices and methods described herein provides beverage in a reliable and safe manner. Production and distribution of beverage can be timed and fine-tuned to suit demand and consumption at the individual or population level. Beverage production can be fine-tuned to obtain a "virtual pipe" of beverage.

Production of beverage is not perfect and may on rare occasions result in bad tasting water or slightly tainted water, or even water that is dangerous to the health.

If becomes known that the contents of a beverage container or set of beverage containers is unsuitable for consumption, the beverage dispensing means can be used to prevent consumption of the beverage by the end user.

The dispensing prevention means may be an optical or sound warning signal to the user, or may blocks dispensing of beverage from the dispensing station. For example, when the dispensing station has a tap, and the dispensing prevention means may lock the tap.

The identification tag may be Near Field Identification (NFC) tag.

In a second aspect of the invention there is provided a beverage dispensing station adapted to support a portable beverage container, and connect to the beverage container such that beverage can be dispensed from the container, said beverage dispensing station comprising an identity tag reader configured to read an identity tag of the beverage container, said beverage dispensing further comprising a wireless network interface where the beverage dispensing station has dispensing prevention means which prevents a user from dispensing beverage from the dispenser, and where the dispensing station is configured to, upon receiving a signal from a server via the wireless network interface, to activate the dispensing prevention means.

The tag reader may be an NFC tag reader. The wireless communication interface may be a cell network interface that enables the beverage dispensing station to server as user equipment in a cell network.

In a third aspect of the invention there is provided a method involving a system, the system comprising
a plurality of reusable and portable beverage containers where each of the plurality of beverage containers carries a unique identification tag,
the system further comprising
a plurality of beverage dispensing stations adapted to support one of the beverage containers, and connect to the beverage container such that beverage can be dispensed from the container, said beverage dispensing stations comprising an identity tag reader configured to read the identity tag of a container, said beverage dispensing stations further comprising a wireless network interface,
the system further comprising a server in communication with the beverage dispensing stations, said server having stored a dataset comprising the identities of each of the plurality of beverage containers, associated to identities of beverage dispensing stations, where the beverage dispensing station has dispensing prevention means which prevents a user from dispensing beverage from the dispenser, the method comprising the steps
a) The server detecting a flag for activation of the dispensing prevention means for a certain beverage container in the dataset,
b) the server identifying, in the dataset, the dispensing station which is associated with the beverage container that is flagged,
c) the server providing a signal to the dispensing station identified in stet b) to activate the dispensing prevention means,
d) the dispensing station activating the dispensing prevention means.

DRAWINGS

The accompanying drawings form a part of the specification and schematically illustrate preferred embodiments of the invention and serve to illustrate the principles of the invention.

FIG. 6 shows a beverage dispensing station.

FIG. 7 is a beverage container in an upside-down position attached to a tap of a beverage dispensing station.

FIG. 8 is a beverage container supported to and connected to a beverage dispensing station.

DETAILED DESCRIPTION

The systems, methods and devices provided herein provide beverages at the point of consumption in a safe and reliable manner, in a "virtual pipe" manner. Hence beverage can be produced and distributed to a consumer in a safe just-in time manner. Traceable containers and smart dispensing stations allow high-level monitoring of system 1 and its various components.

Figure 1:
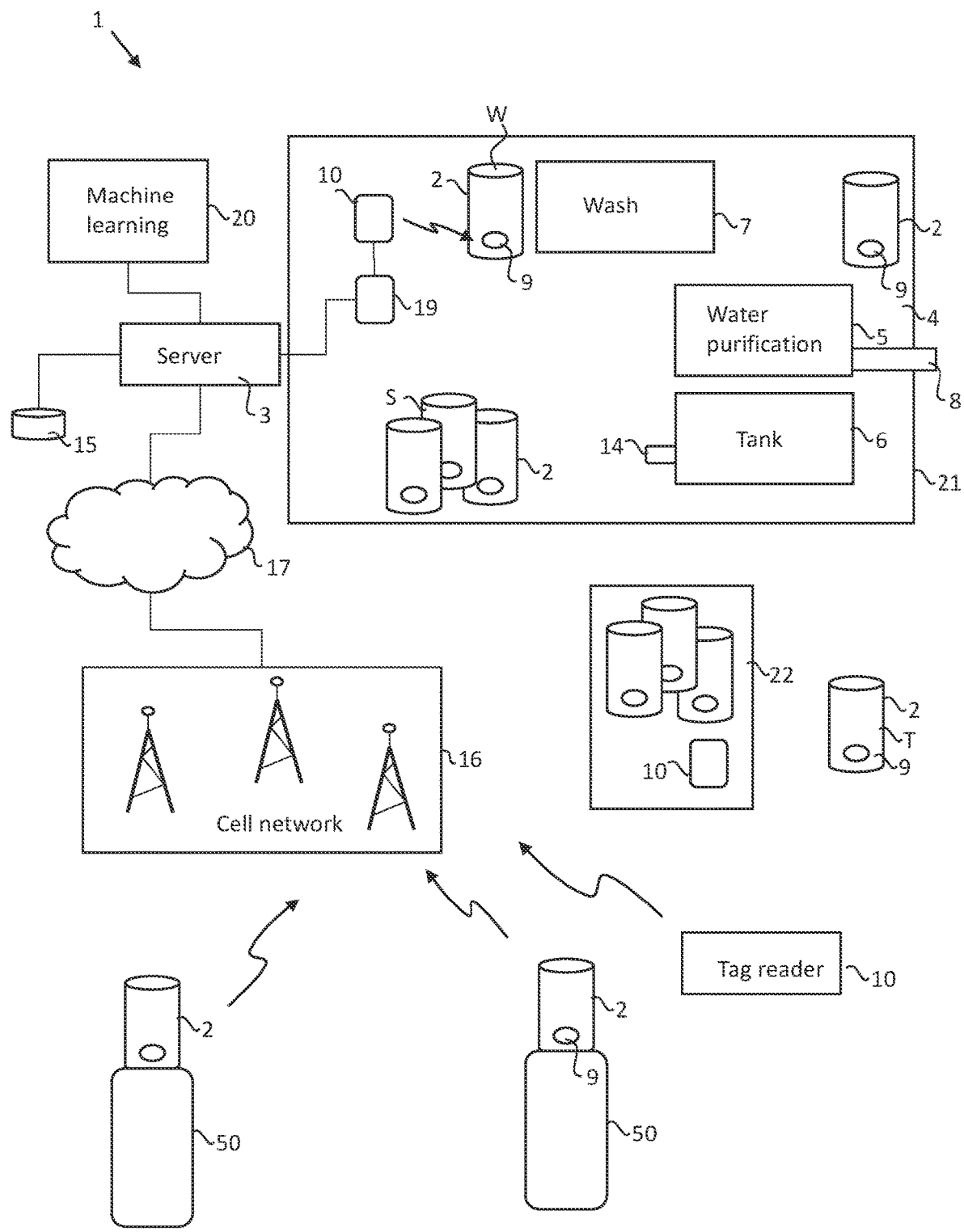
FIG. 1 is a schematic drawing of a system.

With reference to FIG. 1, the system 1 comprises a plurality of beverage containers 2 and a server 3. Beverage containers 2 are preferably reusable. Beverage containers 2 are preferably portable. Beverage containers 2 are preferably reusable and portable. The system 1 may also comprise one or more beverage filling stations 4, one or more identification tag readers 10, and one or more beverage dispensing stations 50. Beverage dispensing station 50 may also be referred to as "dispensing station 50" herein. The beverage dispensing stations 50 are for example located in the homes of end-users, or at restaurants, bars, schools, hospitals, offices or other places of work, sporting facilities, or other places where it is useful to provide beverage. FIG. 1 also shows cell network 16 and wide area network 17, for example the internet.

The system 1 may comprise at least one beverage filling station 4 which is configured to fill reusable beverage containers 2 with beverage. Hence beverage filling station 4 may have means for producing, storing and filling beverage in containers 2 and for washing and storing the containers 2. Hence beverage filling station 4 may comprise a beverage producing unit. The beverage producing unit may comprise a water purification unit 5 which is able to purify water using any suitable technology such as filters, heat, ultraviolet light or chemical means. The beverage filling station 4 will be described in more detail below. In various embodiment the system 1 may also receive pre-filled containers 2 from an outside source, and system 1 may then comprise a beverage container storage 22.

The beverage distributed in the system 1 is preferably water or beer. In various embodiments the beverage is potable water. In other embodiments the beverage is beer.

Figure 2:
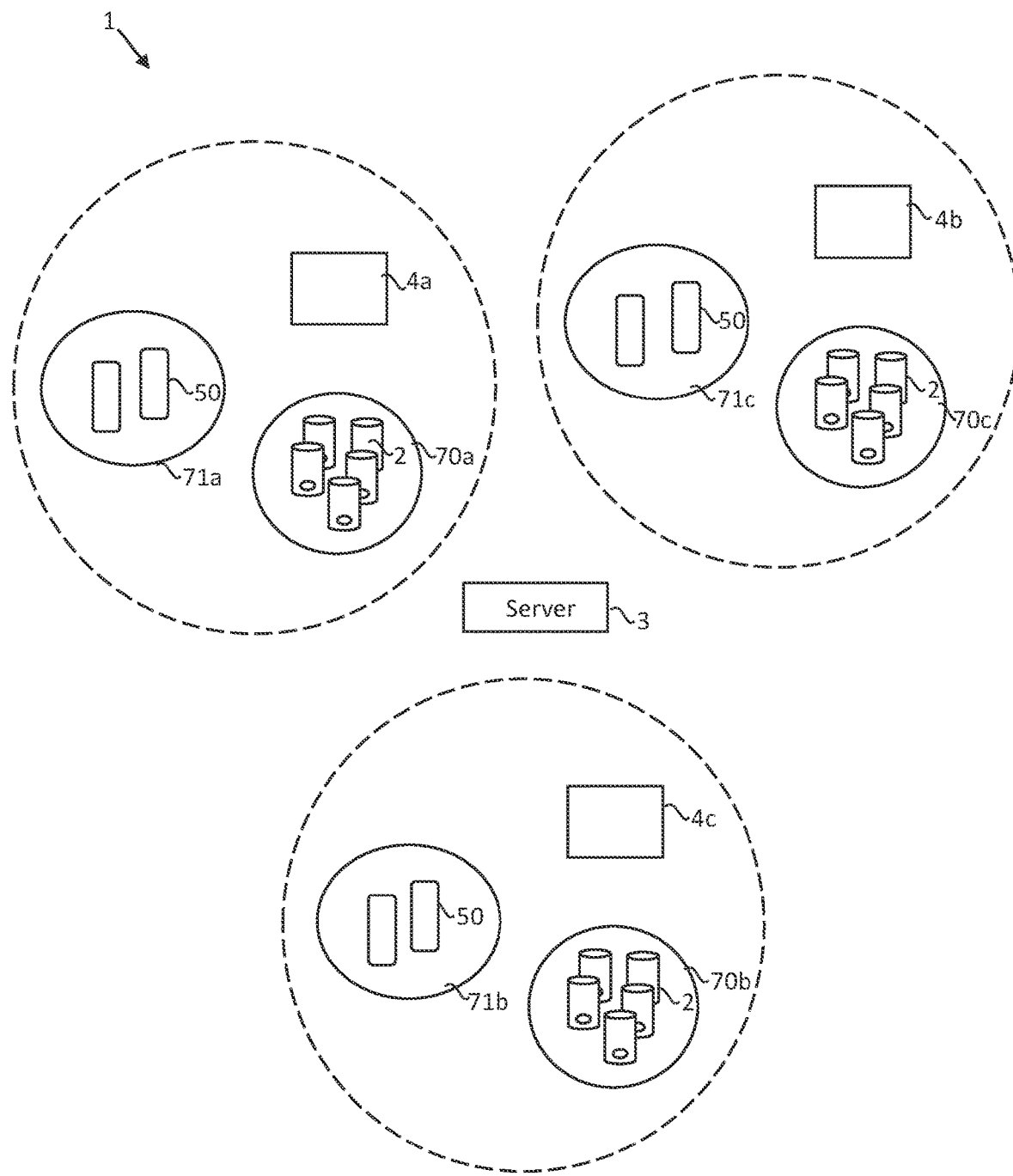
FIG. 2 is a schematic drawing of a system.

Looking at FIG. 2, the system 1 may comprise a plurality of beverage filling stations 4, such as two, three, four, five or more filing stations 4, which will be described in more detail below. Each beverage container 2 may be logically associated in a dataset 15 with a certain filling station 4 so that each filling station 4 has a "fleet" of beverage containers 2 and dispensing stations 50 (see below), as seen in FIG. 2. FIG. 2 is a schematic drawing showing how three different filling stations 4a, 4b 4c, each are associated with a fleet 70a, 70c of containers 2 and separate fleets 71a, 71b, 71c of dispensing stations 50.

With reference to FIGS. 1 and 2, beverage filing station 4 may have a computer 19 that may be in network communication with server 3. In various embodiments computer 19 of filling station 4 provides information to a filling station user and may enable filling station user to monitor and manage his or her fleet of beverage containers 2 and dispensing stations 50. Such a user may have access to only certain functions of the system 1.

Server 3 comprises or has access to dataset 15, and dataset 15 will be described in more detail below. Server 3 may provide instructions to computer 19 regarding production of beverage and filling beverage into containers 2. Server 3 may be able to make predictions, using data set 15, about beverage consumption in system 1 and use the predictions to provide instructions to beverage filling station 4 regarding how much beverage should be produced or how many filled beverage containers 2 should be produced. For example, when an increase of demand is predicted, production may be increased. Server 3 may also comprise a price determining mechanism for determining a price for a filled beverage container 2.

The system 1, for example server 3, may comprise resources for placing orders for beverage containers 2, such as replacement of empty beverage containers 2, payment, booking of transport resources, and pricing determination mechanisms. End-users may be able to log into system 1 with a user account and place an order for a beverage container 2 using a mobile device, for example. Furthermore, server 3 may comprise logic (beverage consumption tracking module) that automatically ships beverage container 2 to a dispensing station 50 when needed.

Beverage is stored in tank 6 of beverage filling station 4. Beverage filling station 4 may also comprise a tap 14 and one or more areas for storage of beverage containers 2. Beverage filling station 4 may also have a washing station 7. The washing station 7 may be arranged for washing beverage containers 2, for example by using hot water or detergents. Hence, washing station may comprise at least one sprayer for spraying hot water or detergent into the beverage container 2. Water purification unit 5 may be connected to an inlet 8 for non-purified water from some water supply such as a lake, a river or a utility that provides water. The filling station 4 and in particular beverage filling station container 21 may have an inlet or door (or both) for accepting beverage containers 2 and for discharging them. The beverage filling station 4 is described in even more detail at the end of the description.

Beverage containers 2 are filled with beverage in filling station 4. Preferably they are washed in washing station 7 preferably before filing the containers 2. The containers 2 then leave filling station 4 to be distributed to end-users.

End users typically have one or more beverage dispensing stations 50. End-users may pick up beverage containers 2 at filling station 4 or more preferably have the containers 2 delivered to them. In FIG. 1, T designates a beverage container 2 that is in transfer from filling station 4 to a dispensing station 50. W designates a beverage container 2 that has just left the washing station 7. S designates a storage of filled beverage containers 2 waiting for transport to end-users (beverage dispensing stations 50). Washing station 7 may be organized as a processing line where the beverage container 2 enters filling station 4, is washed in washing station 7 and then exits washing station 7. Hence filling station 4 may have dedicated areas for storing containers 2, washing containers 2, and filling containers 2. Washing station 7 may be completely automatic or semi-automatic.

As used herein and "end-user" is a user that operates a beverage dispensing station 50. End user may buy filled beverage containers 2 or has filled beverage containers delivered to him/her. End-users may be able to order filled beverage containers 2.

A "server user" is a user that manages the system 1 in some respect. A server user has access to the server 3 or parts thereof using a user interface. Server users may have different permissions, such that some server users may have control over the entire system 1, whereas other server users have more limited access. Some users may only be allowed to control one or a few beverage fillings stations (4a, 4b, 4c), as system 1 may comprise more than one filling station 4, or a subset (70a, 70b, 70c) of beverage containers 2 or a subset (71a, 71b, 71c) of beverage dispensing stations 50 with reference to FIG. 2.

An end user or a server user may be able to use a mobile phone, such as an iPhone, to send and receive information to server 3. The mobile phone (also referred to as "mobile device" herein) may be configured, for example by having an app, so that it is network communication with server 3. An example of a smart phone is the iPhone. A server may for example cause the display of a message on a display of the mobile phone.

The reusable beverage containers 2 in the system 1 each have a unique identification tag 9. The identity of the identification tag 9 is unique for each beverage container 2. Off course, by mistake there may be two or more containers 2 that have the same identity, but the purpose is that each beverage container 2 has a unique identity. Hence at least some of the plurality of beverage containers 2 have unique identities. The identity may be a unique combination of symbols such as digits or letters, for example a number.

A tag reader 10 is able to read the identity stored in the identification tag 9. In general, identification tag reader 10 can be of different kinds and is adapted to the kind of identification tag 9 used for the beverage container 2. For example, the tag reader 10 may be able to use induction to induce a current in circuits of the tag 9 to cause tag 9 to transmit a signal that can be detected by tag reader 10. It is preferred that the identification tag 9 is an RFID tag in particular of a type that can be read with the aid of NFC (Near Field communication) technology. The unique identification tag 9 may be for example a RFID tag which can be read by a RFID tag reader 10. Or the identification tag 9 may be a bar code that can be read by a bar code reader. The identification tag 9 and the identification tag reader 10 may also be implemented using 5G technology, in which case the identification tag 9 comprises a battery or other energy storage. It is preferred; however, the identification tag does not comprise a battery.

Figure 3A:
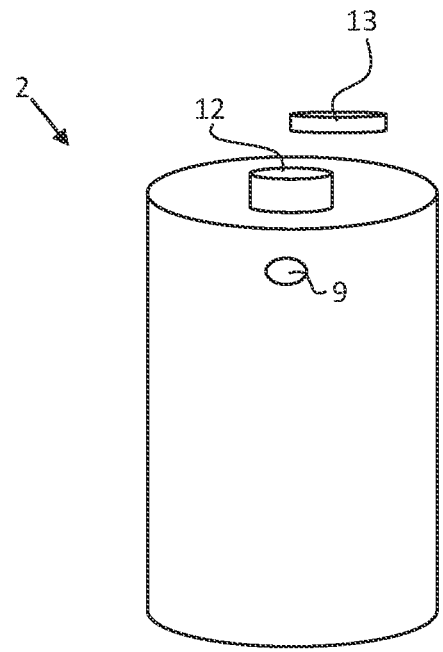
FIGS. 3a and 3b are schematic drawings of a beverage container.
Figure 3B:
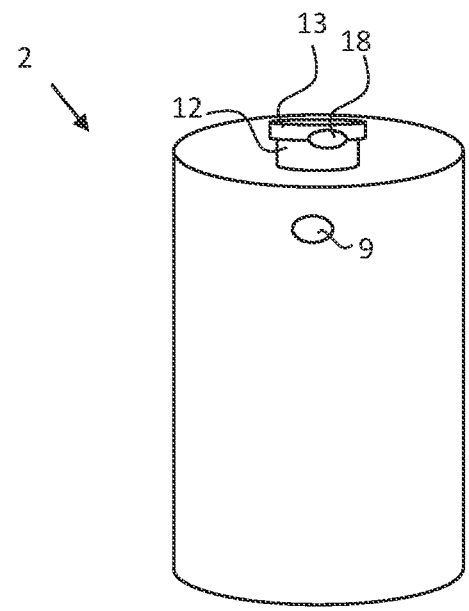
Figure 4:
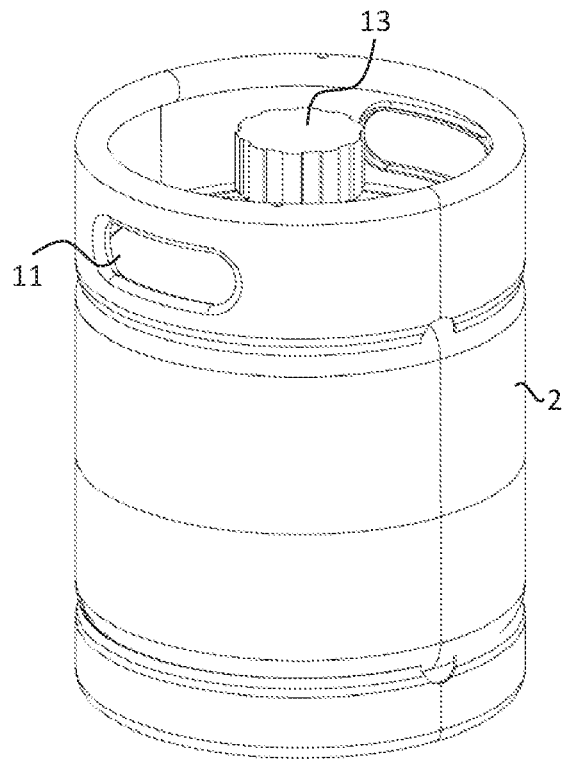
FIG. 4 shows a beverage container.
Figure 5:
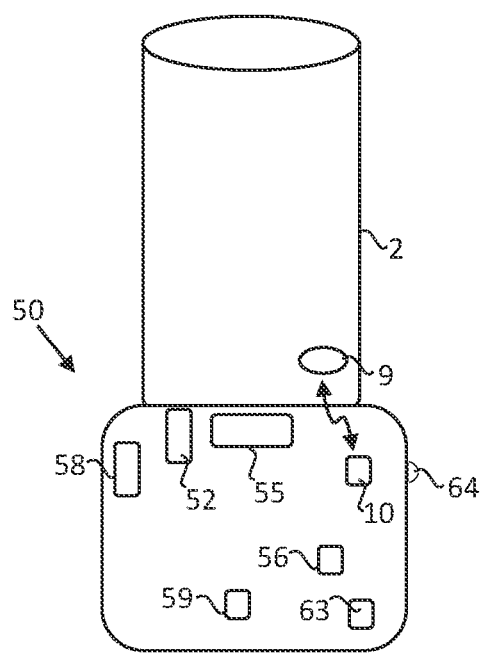
FIG. 5 is a schematic drawing of a beverage dispensing station.
Figure 9:
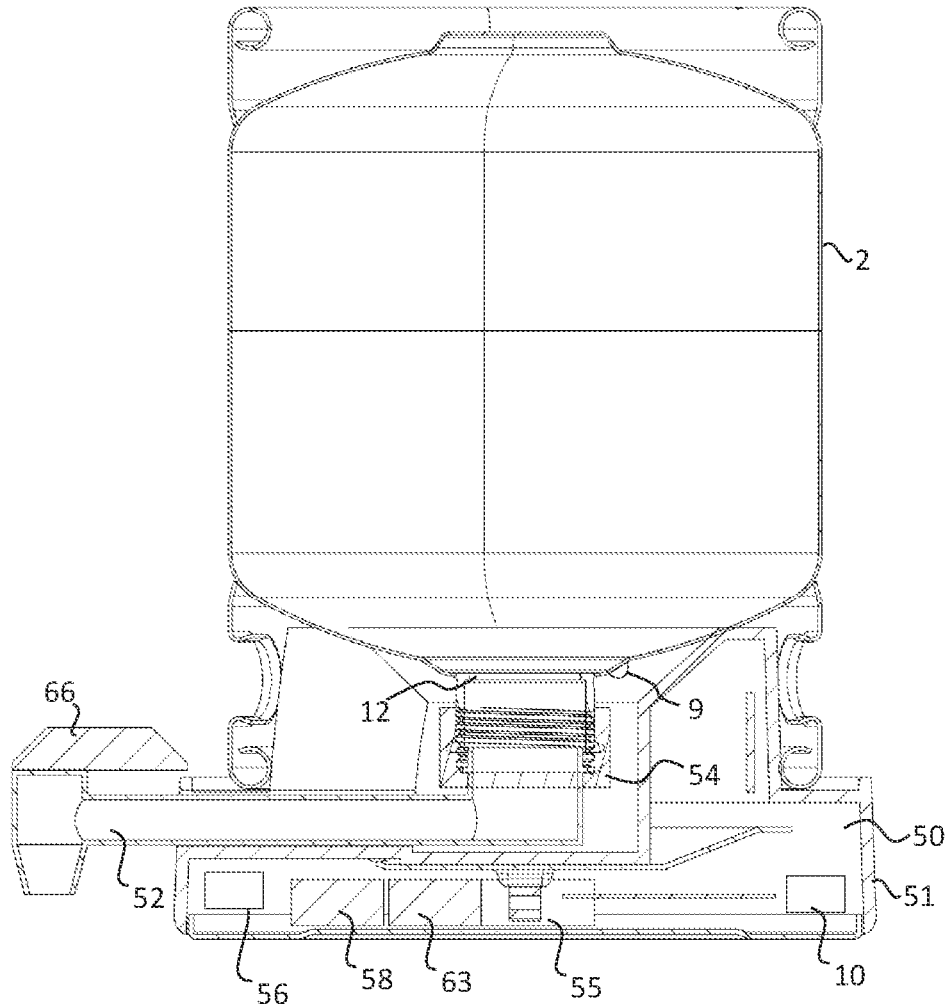
FIG. 9 is a cut away view of a beverage container and a beverage dispensing station.

A schematic drawing of a beverage container 2 is seen in FIGS. 3a and 3b. A non-limiting example of a container 2 made of stainless steel is shown in FIG. 4, and FIGS. 7-9.

The plurality of reusable beverage containers 2 preferably have a volume of from 2 to 100 litres, more preferably 3-30 litres and even more preferably 8-25 litres. The containers 2 are preferably portable when filled with beverage. For example, the container 2 may have a handle 11 (FIG. 4) for carrying the container. The containers 2 are preferably made of a metal such as stainless steel or aluminium, or a polymer material such as plastic, such as for example polycarbonate, which may be reinforced by for example glass fiber or carbon fiber. Stainless steel is however a preferred material. The material may be non-transparent. The container 2 may have any suitable shape, for example a cylindric shape.

A different suitable shape and size may be the type of container used in "water coolers" frequently found in office spaces etc. The beverage container 2 is typically not designed to drink directly from.

The containers 2 should preferably be easy to clean and preferably have a low weight and be durable in order to allow use many times. The number of use cycles is preferably predicted to be from 10-1000 for an individual container 2, where each cycle includes one filling the container 2 with at least some beverage and providing it to an end user. Hence, the containers 2 are preferably suitable for repeated filing and distribution to an end user.

The identification tag 9 is attached to the container 2 or is otherwise comprised in container 2. For example, an NFC tag may be glued to the container 2 or a bar code may be in the form of an adhesive sticker attached to the outer surface of the container 2. A tag 9 may also be inserted into container 2 at production, for example during casting of a container 2 made of a polymer material.

The identification tag 9 is preferably attached to the container 2 in a permanent manner. However, single use tags or limited time use tags 9 may also be used.

That the identification tag 9 is attached in a "permanent manner" means that it is intended to be attached to the beverage container 2 for the duration of the expected lifetime of the beverage container.

The tag 9 preferably has a low weight and a small size. The weight of tag 9 is preferably negligible compared to weight of container 2. This is also true for second tag 18 described in more detail below. The weight of the identification tag 9 or second tag 18 is preferably less than 50 grams, even more preferably less than 10 grams and most preferably less than 1 gram.

The beverage container 2 has at least one opening 12 for filling and tapping beverage. The opening 12 is closable, for example with a lid 13. The lid 13 may be disposable or reusable. It may be possible to pour beverage from the opening 12 which is then used as a spout. Alternatively, the beverage container 2 is attached to a beverage dispensing station 50 and beverage dispensed from the station 50, as described in more detail below.

The system 1 comprises a plurality of reusable beverage containers 2. The number of beverage containers may be at least 100, preferably at least 1000.

The tag reader 10 is arranged to detect the identity tag 9 from a suitable distance. The tag reader 10, is preferably, as mentioned, an RFID or NFC tag reader and hence comprises suitable hardware as is known in the art. The tag reader 10 may be arranged not to detect tags 9 that are beyond a certain distance, which may be 10 m, preferably 5 meters, 1 meter or 20 cm, more preferably 10 cm and most preferably 5 cm and even more preferably 2 cm. Hence the tag reader 10 may have a detection distance limit. The specificity of the tag reader 10 may be increased by using a directional antenna in the tag reader 10, as described in more detail below with reference to FIGS. 10 and 11.

For example, the dispensing station may have a directional antenna that directs the zone of detection 57 towards the intended position of the beverage container 2 on the dispensing station.

System 1 may comprise at least two different tag readers 10. The at least two tag readers 10 may have different geographical locations, meaning that they are at least 20, more preferably at least 100 meters apart. For example, a first tag reader 10 may be at a filling station 4 or a beverage container storage 22 whereas a second tag reader may be at a dispensing station 50. For example, tag readers 10 may be present in dispensing stations 50 at different geographical locations in a geographical area such as a city, for example different homes of end-users. Hence the tag readers 10 may be present at stationary geographical positions. However, tag readers 10 may also be carried in trucks or cars used for distribution of beverage containers 2 or manually carried by personnel involved in distribution of beverage containers 2.

The geographical position is preferably a known geographical position. The geographical position may be known by for example, storing the coordinates or an address in the dataset 15. However, geographical positions are not necessarily known. Positions may be obtained for example, automatically by using positioning services (GPS), addresses of end users as known from client registers in system 1, or by manually entering the positions. It may be sufficient, for example in the machine learning application of FIG. 17, to know the distance between various geographical positions, for example distances between a beverage filling station 4 and various beverage dispensing stations 50.

In various embodiments at least one tag reader 10 is comprised in one or more beverage dispensing stations 50. The tag readers 10 may be used by system 1 to detect that a beverage container 2 is present at one of tag readers 10, for example present at the one of the dispensing stations 50. The tag reader 10 may be used in system 1 to detect that a beverage container 2 is present at, supported by or connected to a certain dispensing station 50.

Tag reader 10 is in digital communication with the server 3. System 1 may use tag reader 10 to gather useful information in dataset 15 about a certain beverage container 2. The information is at least that the beverage container 2 is present at the tag reader 10. The system 1 may also use a tag reader 10 to record the state of a certain beverage container 2, for example that a beverage container 2 is in a "washed" state, "present at beverage station" state or similar. This state is preferably stored in dataset 15.

A tag reader 10 may be arranged to detect that a beverage container 2 is present at one of the tag readers 10, for example at beverage dispensing station 50, and provide that information to the server 3. This may be stored in dataset 15, preferably together with a time point for detection.

The tag reader 10 is preferably a part of a beverage dispensing station 50 or provided in a beverage filling station 4, and the tag reader 10 may use hardware and software of those components to communicate with the server 3. However, tag reader 10 may also be independent from a filling station 4 or a beverage dispensing station 50 such as the case may be with a tag reader 10 present at distribution centre comprising a beverage container storage 22 or present in a vehicle or carried by a person, such as a person that distributes beverage containers 2. Such independent tag reader 10 may each comprise a battery or other power source, a processor, a memory, and a wireless network interface, and control circuitry (FIG. 19), and are capable of communicating with server 3. A mobile phone such as an iPhone with NFC capability may be used.

Filling station 4 may have one or more tag readers 10. For example, a tag reader 10 may be located in a frame on a door on beverage filing station 4 to detect movement in or out from the beverage filling station 4, in particular beverage filling station container 21. As a further example, a tag reader 10 may be located at the exit of the washing station 7. Various parts of all of beverage filling station 4 may have a dedicated workflow so that a beverage container 2 moves from one part to the next, for example, entering filling station 4, going through washing station 7, being filled at tap 14, being stored, and then exiting filling station 4 and tag reader 10 may be arranged to detect the presence of the container 2 at the various stations or areas of beverage filling station 4.

The tag reader 10 may be for example be arranged so that is able to detect when a beverage container 2 has left the washing station 7 and hence can be assumed to be clean. For example, when the tag 9 is an NFC tag the tag reader 10 is an NFC reader arranged at a suitable distance from exit of washing station 7 so that beverage containers 2 that have been washed (and not other beverage containers 2) are detected as the pass the exit of washing station 7. Similar arrangements may apply wherever tag reader 10 is placed in the system 1. Hence a tag reader 10 is placed in system 1 to ensure that the detected state can be determined with some certainty.

Tag reader 10 or a plurality of tag readers 10 may thus be arranged to detect beverage container 2 as it passes various parts of system 1 and provide data about this to server 3, and server 3 may store such information in dataset 15. The server 3 receives the information from the tag reader 10 and may use the information to change a state of an individual beverage container 2 in dataset 15.

The server 3 may be able to combine the information (i.e., the identity of the beverage container 2) from the tag reader 10 with a predetermined piece of information associated with a certain tag reader 10. For example, an identity reading from a certain tag reader 10 always determines a certain predefined state for a container 2. For example, reading from a certain tag reader 10 may change the state of the container 2 from "unwashed" to "washed" for example, or from "in station" to "have left station" ("unwashed" may also be referred to "have entered station"), as described in further detail below.

Hence a tag reader 10 may have an identity in system 1. When the tag reader is part of dispensing station 50, the identity of the tag reader is preferably the same as the identity of the dispensing station.

Detection of a tag 9 of a beverage container 2 by a tag reader 10 may for example result in the server 3 setting the state of the beverage container 2 in the dataset 15 to one of the following:
  a) the container 2 has entered the beverage filling station 4, in particular beverage filling station container 21,
  b) the container 2 has been washed,
  c) the container 2 has been filled with beverage in the beverage filling station 4,
  d) the container 2 has left the beverage filling station 4, in particular beverage filling station container 21,
  e) the container 2 is in distribution,
  f) the container 2 has been left with an end user of a beverage dispensing station
  g) the container 2 is present at a beverage dispensing station 50,
  h) the container 2 is not present at any beverage dispensing station 50.

States may be exclusive such that an individual container 2 can only have one state at a time. For example, a container 2 should not be able to be present at a beverage dispensing station 50 and not present at any beverage dispensing station 50. This may be provided with logic in server 3, for example database logic. Error detection logic in server 3 may be arranged to detect an erroneous state transfer.

A first tag reader 9 may detect a first state selected from a) to h) and a second tag reader 9 may detect a second state selected from a following step selected from b) to h). The first and second tag reader may provide this information to the server 3.

The tag reader 10 may be able to read a plurality of tags 9 simultaneously or during a short time. For example, if a truck loaded with a number of beverage containers 2, an RFID tag reader 10 may be arranged to read the tags 9 of all the beverage containers 2 in the truck as the truck passes the RFID tag reader 10.

Returning to FIG. 1, system 1 comprises server 3. As described below, server 3 may be a virtual server. Server 3 maintains or comprises a digitally stored dataset 15, which may be in the form of a database. Any suitable form of database architecture, such as an SQL database, may be used. The identity of each beverage container 2 is stored in dataset 15. Dataset 15 may maintain information that is particular to an individual beverage container 2 such as for example information about when a container 2 was put into use in system 1, number of filling cycles, date of manufacture, make, etc. This information is associated with the identity of the beverage container 2. The dataset 15 may also comprise information about the current state of the beverage container 3 as recorded by tag reader 10 as described above.

It may also be possible, for a server user, to add containers 2 to database and then logically associate them with a particular filling station 4. It may also be possible to manually enter information into dataset 15, for example if a certain beverage container 2 is broken and/or has to be taken out of service.

Hence, the server 3 is configured to store data relating to the plurality of reusable beverage containers 2 in a digitally stored dataset 15. Preferably the server 3 is also configured to store data relating to the plurality dispensing stations 50 in the dataset 15.

Server 3 comprises suitable logic components and software to carry out the methods as described herein, such as but not limited to: a beverage consumption tracking module, beverage container tracking module, error detection logic, container error flagging module, dispensing prevention means activation module, beverage production control logic, database interface, network interface and operating system.

For example the following information may be associated with the identity of certain beverage container 2 in the dataset 15 (some of these will be explained in more detail below): type of beverage, beverage container 2 has been filled, amount of beverage left in beverage container 2, number of filling cycles, date of manufacture, current position, information that beverage in container 2 should not be consumed, identity of second tag 18 (tampering tag), state of second tag 18, the container 2 has entered the beverage filling station 4, the container 2 has been washed in the beverage filling station 4, the container 2 has been filled with beverage in the beverage filling station 4, the container 2 has left the beverage filling station 4, the container 2 is in distribution, the container 2 has been left with a user of a beverage dispensing station 50, the container 2 is present at a beverage dispensing station 50, identity of filling station 4 to which the beverage container 2 belongs, the container 2 is not present at any beverage dispensing station 4, identity of a previous dispensing station 50 the beverage container 2 has been associated with, dates of previous filing cycles, date and time of tag readings, beverage dispensing events, weight data or beverage consumption data. These are non-limiting examples.

For example the following information may be associated with the identity of a dispensing station 50 in the dataset 15: identity of current beverage container 2 present at dispensing station 50, no beverage container 2 present, sensor data, temperature sensor data, weight data or beverage consumption data, communication log, flag for no changes since previous communication session, dispensing prevention means 65 are to be activated, dispensing prevention means 65 have been activated, error messages, battery status, beverage dispensing events, sensor data, identity of filling station 4 to which the dispensing station 50 is associated, identity and contact details of end user, log in details for end-user, order status etc. These are non-limiting examples.

Details for handling communication between server 3 and mobile phone of an end user associated with the beverage dispensing station 50 may also be included in the dataset. This may be used by server 3 to push information to the end user of a particular beverage dispensing station. Information may include shipping information, weight data or beverage consumption data, how much beverage is still in beverage container 2, or a message that content of a certain beverage container 2 should not be consumed.

All data may be stored for previous events so that a history for each beverage container 2 and dispensing station 50 is stored in dataset 15.

Server 3 may comprise logic that detects errors with regard to a beverage container 2 or a beverage dispensing station. Hence an individual beverage container 2 should not be able to change state directly from "unwashed" to "filled". Such a change (from "unwashed" to "filled") should only be allowed if the container 2 has been in the state "washed" after "unwashed". If tag readers 9 provides such conflicting information, there is an error. The error may be detected by software in the server 3, for example by database software. The database software may for example be adapted to generate an error flag. Errors can be detected in other ways for example the machine learning method of FIG. 17. An error regarding a container 2 may lead to the generation of an error report by server 3 or may lead to that the container 2 is excluded from distribution. Exclusion may for example be carried out such that a certain container 2 is flagged to not be filled or not to be distributed to an end-user. Warning may be provided as sound signals, or in a display or a flashing light in filling station 4, a message to end user or server user or activation of dispensing prevention means 65 (see below).

With reference to FIGS. 1-2 and to FIGS. 5-11, system 1 preferably comprises one or more beverage dispensing stations 50. The dispensing station 50 is used for dispensing beverage from a beverage container 2.

Many different designs for the beverage dispensing station 50 are possible. The beverage dispensing station 50 of FIGS. 6-9 comprises a free-standing housing 51 that supports the beverage container 2 which is placed on top of the housing 51 with the opening 12 downwards. A separate tap 52 is attached to the opening 12 and is used to control dispensing by the end user. Beverage may then be dispensed using gravity flow. Tap 52 comprises a valve (not shown), handle 66 for operating the valve and connector 54. Tap 52 may physically interface with housing 51. For example, as shown in FIG. 8 where the tap 52 rests in a V-shaped notch 53 of the housing 51. Again, this is just an example and tap 52 may also be integrated with housing 51. In general, a tap 52 of a beverage dispensing station 50 may be operated in any suitable way such as for example with by a push button, or any other suitable means for controlling a valve. Tap 52 may for example comprise an electronically controlled valve for dispensing beverage.

In general, the housing 51 may comprise control circuitry and various sensors such as weight determining means 55, accelerometer 56, battery 63, a LED light 64 and wireless network interface 58 as described below.

There are numerous possibilities for the design of dispensing station 50. Other possible designs include a design similar to a "water cooler" frequently found in office workspaces.

The dispensing station 50 may be suitable to stand on a bar, a table or a bench top or it may be designed to be free standing on a floor or on the ground. The beverage dispensing station 50 may also be integrated into furniture, in particular furniture suitable for kitchens, restaurants, and bars. The dispensing station 50 may also be integrated into a fridge.

Beverage may be dispensed from the dispensing station 50 as flowing beverage using gravity flow or by providing pressure inside container 2. FIGS. 6-9 show a beverage dispensing station 50 suitable for dispensing beverage with gravity flow. The beverage is preferably dispensed from the beverage container 2 while being mechanically connected to the beverage dispensing station 50, or while being supported to the beverage dispensing station 50.

When pressure is used, as may be the case with beer, the dispensing station 50 may comprise means for pressurising the beverage container 2 as is known in the art. Typically, the beverage dispensing station 50 then comprises means for providing pressurized carbon dioxide (other inert gas) into the beverage container 2. The means for providing carbon dioxide may comprise a first pipe that is inserted into the container 2 and provides pressurised carbon dioxide to drive the beverage out from the container 2 from a second pipe. The dispensing station 50 with use for beer may be designed so that the opening 12 of container 2 is directed upwards, and the dispensing station 50 or a part thereof may then be designed to rest on top of the container 2. In particular, a connector for piping and means for providing carbon dioxide may rest on top of the opening 12.

When beverage is dispensed using gravity flow, a valve may allow ambient air to flow into beverage container 2.

Dispensing station 50 may be configured to mechanically support a beverage container 2. Hence, a part or the entire weight of beverage container 2 may rest on dispensing station 50. Dispensing station 50 or a part thereof may be arranged to mechanically receive a beverage container 2. The beverage container 2 may be able to be mechanically connected to the dispensing station 50, for example with the use of lugs, bayonet coupling, click-on or threads or other connection means. The dispensing station 50 may be able to engage with the beverage container 2. Preferably the dispensing station 50 is such that only one beverage container 2 is supported by or connected to beverage dispensing station 50. Hence, it is preferred that beverage dispensing station is able to mechanically support, mechanically receive or mechanically connect to one single beverage container 2 or engage with one single beverage container 2.

The container 2 can be mechanically connected to the dispensing station 50 such that beverage can be dispensed from the container 2. The dispensing of beverage preferably occurs through a part of the dispensing station 50. For example, the dispensing station 50 may have a connector 54 which connects to the opening 12 of the beverage container 2.

System 1 preferably comprises a plurality of dispensing stations 50, such as two, three, four or more dispensing stations 50, such at least ten or at least 100 dispensing stations 50. Each dispensing station 50 may have a unique identity in system 1. The identity is stored in the dataset 15. A beverage dispensing station 50 may be logically connected to one certain beverage filling station 4, for example in dataset 15, as shown in FIG. 2. The logical connection may be in the dataset 15.

The beverage container 2 may be switched such that a first beverage container 2 that is mechanically connected to or supported by the dispensing station 50 is replaced with a second beverage container 2 which then becomes mechanically connected to, or supported by, the dispensing station 50.

Figure 12:
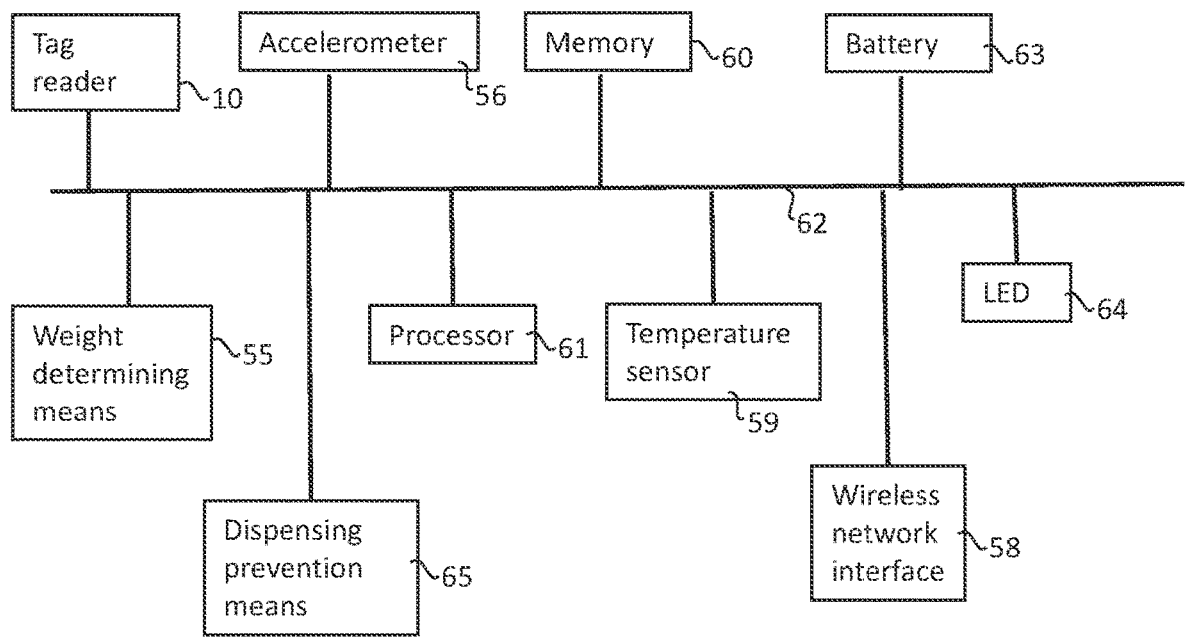
FIG. 12 is a schematic drawing of parts of a beverage dispensing station.

Looking at FIG. 12, beverage dispensing station 50 has or comprises control circuitry comprising a memory 60, a processor 61, and a bus 62. The control circuitry may be partly arranged on a printed circuit board (PCB). The control circuitry is electrically connected to the various sensors, the tag reader 10, the wireless communication interface 58, the battery 63, the LED 64 and the dispensing prevention means 65. The control circuitry may comprise a timer and a clock. Memory 60 stores software for participating in, or carrying out the various methods described herein.

The dispensing station 50 furthermore may further comprise a battery 63 for powering the various electric and electronic components of the dispensing station 50 such as the control circuitry, the sensors, the wireless network interface 58, tag reader 10 and the dispensing prevention means 65. Power may also or alternatively be provided by a connector and a regular power outlet.

Beverage dispensing station 50 preferably has one or more sensors. The sensor of the beverage dispensing station 50 may for example be a weight determining means 55, an accelerometer 56, or a beverage flow sensor. In a preferred embodiment the dispensing station 50 has at least a weight determining means 55 and an accelerometer 56.

The beverage dispensing station 50 may have at least two sensors, a first sensor that is able to wake up the control circuitry from a sleep state to a wake state and second sensor that determines the amount of beverage that is consumed. The first type of sensor may be able to wake up processor 61 with the use of an interrupt pin of processor 61, by providing a signal to the interrupt pin. In a preferred embodiment the second sensor is weight determining means 55. In a preferred embodiment the first sensor is an accelerometer 56, and the second sensor is weight determining means 55.

In one embodiment the first sensor is a sensor that may be able to detect the presence of a person, such as a proximity sensor. For example, the sensor may be able to detect a person that is located close to the beverage dispensing station 50. The threshold distance for detection may be for example from 0.25-1 meter. Examples of such a sensor includes a proximity sensor based on detection of infrared light (IR) or an inductive presence sensor.

Returning to FIGS. 5 to 12, the dispensing station 50 preferably has a tag reader 10. The tag reader 10 is arranged to detect the identity of the beverage container 2 that is present at the beverage dispensing station 50. Preferably the tag reader 10 is arranged to detect a beverage container 2 that is supported by or mechanically connected to the dispensing station 50. Preferably the tag reader 10 of a dispensing station 50 only detects the tag of a certain beverage container 2 if the beverage container 2 is supported by the dispensing station 50 or mechanically connected to the dispensing station 50 such that beverage can be dispensed from it.

Figure 10:
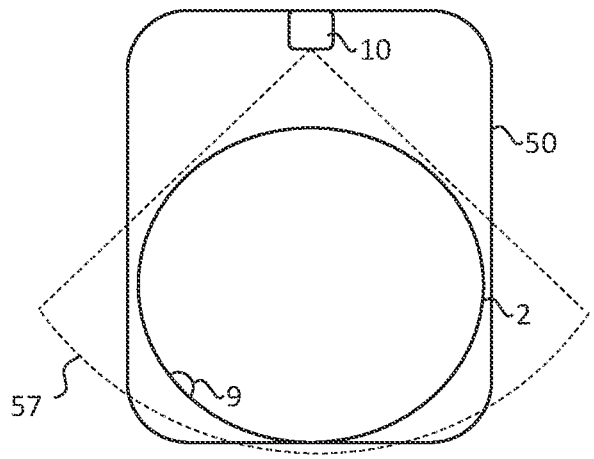
FIGS. 10-11 are schematic top views of beverage dispensing station and beverage containers.
Figure 11:
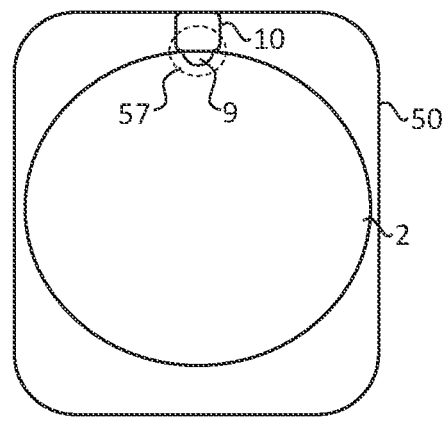

The tag readers of FIGS. 10 and 11 shows two different examples of how the tag reader 10 can be arranged in a beverage dispensing station 50 (schematically shown from above) and only detects a beverage container 2 supported by the dispensing station 50. In FIGS. 10 and 11 the beverage container 50 rests on dispensing station 50.

For example, the tag reader 10 may be NFC tag reader 10 that reads at a short distance and in a certain direction, forming a field of detection 57 directed to the site where the beverage container 2 is located on the dispensing station 50, see FIG. 10. A tag 9 outside the field of detection 57 is not detected by tag reader 10. The tag reader 10 of FIG. 11 has an even shorter range of detection, and only detects the tag 9 when the beverage container 2 is oriented in the correct manner so that the tag 9 faces the tag reader 10. This may be achieved with the use of a directional fit between the beverage container 2 and the dispensing station 50. For example, the correct orientation may be achieved with use of keying between the beverage container 2 and the dispensing station 50. The arrangements of FIGS. 10 and 11 are examples only.

The tag reader 10 may be activated in various manners by the control circuitry of the dispensing station 50. For example, the tag reader 10 may read the tag 9 of the beverage container 2 at least every predetermined time period such as at least every 5 seconds, at least once every hour or every day. The tag reader 10 may also be activated in various manners, such as by the accelerometer 56, or weight determining means 55, as described herein.

Furthermore, if the weight determining means 55 detects a weight but no tag 9 can be detected it may indicate that a false beverage container 2 is supported by dispensing station 50. If this happens, beverage dispensing station 50 may report this to server 3. The information may be stored associated with the identity of the beverage dispensing station in dataset 15. The beverage dispensing prevention means 65 may be activated or a message may be sent to the mobile phone of an end user.

The beverage dispensing station 50 is in data communication with server 3, preferably using at least partly wireless data communication. Hence the dispensing station 50 has a wireless communication interface 58. The wireless data communication may preferably be provided by the dispensing station 50 acting as user equipment in cell network 16, such as a 3G, 4G or 5G cell network 16. However, other standards such as LoRa may be used. Hence the dispensing station 50 may have an antenna as a part of the wireless network interface 58 suitable for cell network communication, particular for acting as user equipment. Beverage dispensing station 50 may provide data from a sensor to the server 3, such as data from the tag reader 10, weigh determining means 55 accelerometer 56, temperature sensor 59 or flow sensor to server 3, as described below, using the data connection, in particular wireless network interface 58.

The control circuitry of the dispensing station 50 may have a sleep state and a wake state, where the energy consumption is preferably substantially lower in the sleep state. The energy consumption in the sleep state may be at most 30%, more preferably at most 10% of the energy consumption in the wake state. The control circuitry may be woken up from the sleep state for example by a sensor, in particular the first sensor. The control circuitry may go to sleep after a time of inactivity, for example after more than 15 minutes of inactivity. The control circuitry of the dispensing station 50 may be configured to wake up from sleep when dispensing is detected, for example by the accelerometer 56 or the weight determining means 55. Weight determining means 55 may be connected to an amplifier that amplifies the signal for this purpose. The first sensor may be connected to an amplifier that amplifies the signal for this purpose.

Figure 13:
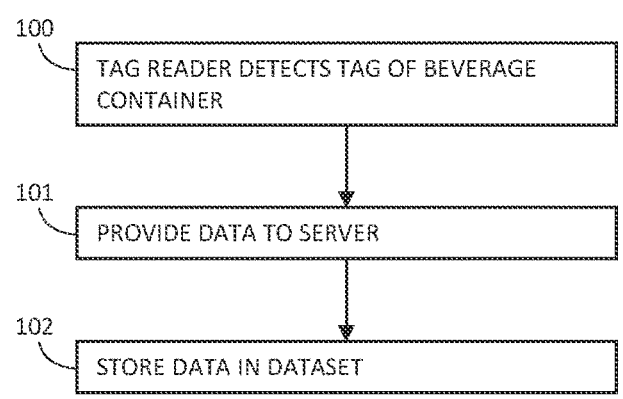
FIGS. 13-18 are flow charts showing methods.

FIG. 13 describes a communication session between a dispensing station 50 and server 3 involving a tag reader 10 reading the tag 9 of a beverage container 2. A tag reader 10 that is a part of the filling station 4 or an independent tag reader 10 carries out a communication session with server 3 in a similar manner. In step 100 the tag reader 10 in particular a tag reader of a dispensing station 50, detects the tag 9 of an individual beverage container 2. This involves reading the identity of the tag 9 which is also the identity of the beverage container 2. The identity is stored in the memory 60 of the dispensing station 50, preferably together with a time point for detection. Preferably other sensor data, such as data from weight determining means 55 or accelerometer 56 is also determined and stored, see below. Step 100 may be initiated by for example first sensor, such accelerometer 56 or weight determining means 55, that wakes up the control circuitry of the dispensing station 50 from sleep or otherwise provides a signal to control circuitry that causes tag reader 10 to read the tag 9. Step 100 may also by initiated by the end-user interacting with the beverage dispensing station 50, for example switching on the beverage dispensing station with use of an on/off switch.

In step 101, the identity of the container 2 is provided to the server 3. Preferably the beverage dispensing station 50 uses the wireless network interface 58 for establishing a data connection to server 3. Preferably the identity of the dispensing station 50 is also provided to the server 3. The communication may be encrypted.

In step 102 the data is stored in the dataset 15 and associated in the dataset 15 with the appropriate beverage container 2 and preferably the identity of the appropriate dispensing station 50. Preferably the identity of the beverage container 2 is associated with the identity of the dispensing station 50 in the dataset. The server 3 may then verify the identity of the beverage container 2. For example, that the beverage container identity is present in dataset 15 and not present at any other beverage dispensing station 50. An error message may be sent to a server user or an end-user if an error is detected, or the dispensing prevention means 65 may be activated, see below.

The data may also comprise a message from dispensing station 50 indicating that the dispensing station 50 works as intended. Such a check may be carried out by control circuitry of the beverage dispensing station 50 at wake up or as scheduled. In one embodiment the transferred data comprises the identity of the dispensing station 50, the identity of the beverage container 2 and a systems ok message. This may for example be provided as a text message (SMS message) from beverage dispensing station 50.

A communication session between the dispensing station 50 and the server 3 may comprise one or more of the following: dispensing station 50 identity, present container 2 identity, battery status, dispensing events, weight, consumption data, other sensor data such as data from accelerometer, temperature data, or a message that indicates no change since previous session. A "no change" message is an efficient way of saving data traffic and power. Sensor data such as accelerometer data, temperature data or data from weight determining means 55 may be associated with a time point for detection which is stored in the memory 60 of the beverage dispensing station 50, and hence also included in the data communication session.

Communication between dispensing station 50 and server 3 may be carried out at any suitable schedule. For example, the dispensing station 50 may be configured to connect to the server 3 at least every predetermined time interval such as, for example, at least every few seconds, every hour, every day or every week.

Table 1 below show a highly simplified and schematic example of dataset 15 showing the identities of three different containers 2 and three different dispensing stations 50. As mentioned herein, the dataset 15 may include many other types of data that are left out in this example. Table 1 shows how the same table is used for beverage containers 2 and beverage dispensing station 50, but two or more tables with cross references may off course be used as the dataset 15 may be structured in any suitable manner.

TABLE 1

| Identity of beverage container | Identity of dispensing station | Remaining amount | Battery status | Last dispensing event | Activate disp. prevention means | Filling station |
|---|---|---|---|---|---|---|
| 5647 | 2354 | 40% | 73% | 10:55. Nov. 26, 2020, 10:55 | no | 1 |
| 1225 | 0122 | 83% | 14% | 16:03, Nov. 10, 2020 | no | 1 |
| none | 2355 | n/a | 99% | 07:32, Oct. 22, 2020 | no | 2 |
| 1002 | none | 100% | n/a | n/a | n/a | 2 |

In the dataset of Table 1, beverage container 2 with the identity 5647 is associated with beverage dispensing station 50 with identity 2354. Beverage container 2 with identity 2355 is an example of a beverage dispensing station 50 that does not presently have a beverage container 2. Beverage container 1002 is an example of a beverage container 2 that is presently not associated with any beverage dispensing station 50.

In various embodiments the dispensing station 50 comprises an accelerometer 56. The accelerometer 56 may be any type of useful accelerometer. The accelerometer may for example be of the type used in mobile phones, such as the iPhone. The accelerometer 56 may be able to detect dispensing or movement of the dispensing station such as jolts or vibrations or changes in orientation or impact, such as if the dispensing station 50 falls to the floor from a table. The accelerometer 56 may also be able to detect tampering. Accelerometer readings above a certain threshold may indicate impact, caused by the dispensing station 50 falling. Such accelerometer readings may trigger a self-test of dispensing station 50, and also a report to the server 3. The accelerometer 56 may have a threshold for detecting movement so that background movements such as traffic does not trigger a signal from the accelerometer 56.

A signal from the accelerometer 56 may be used to wake up the control circuitry from sleep, for example a signal to an interrupt pin on the processor 61 of the control circuitry. A signal from the accelerometer 56 may be used to active the wireless network interface 58 or to activate the weight determining means 55.

A signal from the accelerometer 56 may be configured to cause the tag reader 10 to read tag 9, for example as shown in steps 100-102 of FIG. 13. The accelerometer 56 provides a signal to the control circuitry that in turn activates the tag reader 10, which reads the tag 9 of the beverage container in step 100, and stores the identity in the memory 60 of the control circuitry of the beverage dispenser 50. For example, this may be used to detect if a beverage container 2 has been replaced. A slight jolt of the dispenser during the replacement procedure will activate the accelerometer 56. If a beverage container 2 has been replaced, the identity of the new container 2 read by tag reader 10 is associated with the identity of the beverage dispensing station 50 in the dataset 15. The identity of a previous beverage container 2 associated with the particular dispensing station 50 in dataset 15 may be discarded.

Accelerometer data may be stored in the memory 60 of the dispensing station 50, preferably together with a time point for detection.

In various embodiments, the dispensing station 50 has weight determining means 55 for determining the weight of a beverage container 2 that is supported by the dispensing station 50. The weight determining means 55 may be of any suitably type. For example, a strain gauge type or a load cell may be used. Any suitable type of weight sensor may be used. For example, a metal beam that supports the beverage container 2 is fitted with strain gauge that detects the strain in the beam, typically with the use of an elongated conducting element that changes its resistance when it is bent. The elongated conducted element will typically be oriented so that the weight of the beverage container 2 acts perpendicular to the elongated axis of the strain gauge. The weight determining means 55 may alternatively comprise a piezoelectric crystal that provides voltage when a mass change provides a change in stress of the crystal.

The weight determining means 55 may be used to determine the amount of beverage in container 2. This information may be used by server 3 to determine when a container 2 should be replaced. For example, when the weight of beverage container 2 supported by a dispensing station 50 is below a threshold weight, a new full container 2 is automatically shipped to the user of the dispensing station 50. Server 3 may comprise logic (beverage consumption tracking module) that compares the current filling level (weight) of a beverage container 2 with a threshold weight and automatically provides an order to filling station 4 to produce and ship a new beverage container 2 when the weight is below the threshold weight.

Information about consumption in dispensing stations 50 may also be used in an aggregated manner to track consumption of beverage from a plurality of dispensing stations 50. For example, the consumption for a subset 70a of dispensing stations 50 can be compared with the consumption of a different subset 70b (for example as in FIG. 2) of dispensing stations 50. Subsets may be selected based on geographical location, demography, or the like. The information may be used to make a decision in server 3 about production of beverage in beverage filling station 4.

Beverage consumption data or weight data may also be used as described elsewhere herein for example in relation to machine learning, see below. It should be noted that instead of weight determining means 55 a flow meter in the beverage dispensing station may be used.

Beverage consumption may be determined by control circuitry in dispensing station 50 or by server 3. For example, the dispensing station 50 may provide weight data to server 3 which calculates the consumption. Typically, a weight after the latest dispensing event is subtracted from the weight after the previous dispensing event, to determine the difference in weight. The difference is used as the beverage consumption of the dispensing event. Or the dispensing station 50 may do the calculation and provide consumption data to the server 3. Or the dispensing station 50 may only report that the weight is below a threshold weight. Weight data may be filtered such that only differences above a certain threshold is used in order to filter out noise. It may be an advantage if the consumption or filing level is determined by dispensing station 50 rather than server 3 in order to reduce data traffic in system 1 and data handling by server 3.

The following is an example of calculation of beverage consumption.

Initial total weight 11 kg
Less tare weight: (container possibly tap shown in FIG. 7): 1 kg
Tared weight 10 kg
$1^{st}$ measurement: 9.8 kg
$1^{st}$ consumption: 0.2 kg.

Tare weight may be prestored in memory 60 of beverage dispensing station 50. The use of a tare weight is optional, it may not be needed if it can be assumed that the initial weight is known, for example from the filling station 4.

Temperature data from a temperature sensor 59 may be used to calibrate the weight determining means 55. This may be done in beverage dispensing station 50 or server 3. The server 3 may receive a temperature reading from beverage dispensing station 50 and use this to correct or calibrate a weight value or beverage consumption data. The temperature data may be provided together with the weight data or beverage consumption data.

Hence the weight data may be provided to the server 3 such as weight data, amount of beverage remaining in container 2, amount of beverage dispensed, or that that the weight is below a threshold weight has been passed or by triggering the delivery of a new container 2. All this is referred to as "weight data or beverage consumption data" herein.

The weight determining means 55 may be configured to determine the weight at least every predetermined time interval. For example, the weight determining means 55 may be configured to determine the weight at least every week, every day, every hour, every minute or every second.

The dispensing station 50 may be configured to determine the weight or consumption when dispensing has occurred. Dispensing may be detected with a separate sensor, such as a flow sensor, or a mechanical switch that detects the position of tap 52. In a preferred embodiment dispensing is detected with accelerometer 56. Hence a signal from the accelerometer may activate the weight determining means 55. First sensor may also activate the weight determining means 55.

The accelerometer 56 is preferably arranged in dispensing station 50 such that dispensing beverage from the beverage container 2 activates the accelerometer 56. The signal from an accelerometer 56 may be used to wake up the control circuitry to activate the weight determining means 55, for example by using an interrupt pin on a processor 61 of control circuitry. The accelerometer 56 may for example detect movement of the beverage dispensing station 50, beverage flow, movement of tap 52 or a cup detector. In a preferred embodiment the accelerometer 56 detects movements of the dispensing station 50 itself or the beverage container 2 attached to, or supported by, the dispensing station 50. For example, the accelerometer 56 may be attached to the housing 51 in order to detect vibration or movement of housing 51 that indicates dispensing.

System 1 may be configured to determine a dispensing event. A "dispensing event" comprises at least information about an amount of beverage that has been dispensed from a certain beverage container 2 presently supported by or connected to a beverage dispensing station 50 or weight data for the beverage container 2. That the beverage container 2 is present at beverage dispensing station may be detected by tag reader 10 of beverage dispensing station 10. Weight determining means 55 or a flow meter may be used for determining an "dispensing event". The dispensing event may be stored in the memory 60 of the control circuitry of the dispensing station 50. The dispensing event may be stored together with a time point for dispensing. The dispensing event may trigger a timer.

It should be noted that "detecting dispensing" means, herein, the fact that dispensing occurs or likely occurs and may be detected with for example an accelerometer 56 and may not necessarily amount to a "dispensing event".

Weight data or beverage consumption data may be provided from the dispensing station 50 to the server 3 at any suitable interval, such at least every predetermined time interval, such as, for example, at least every week, every day, every hour or every minute. It is an advantage if communication takes place as little as possible in order to save the battery 63 of dispensing station 50 and keep data traffic at a minimum.

In a preferred embodiment the weight determining means 55 is activated by the first sensor. The dispensing station 50 may be configured to activate the weight determining means 55 after a predetermined waiting time. The predetermined time may be at more preferably at least 10 seconds and even more preferably at least 1 minute and even more preferably at least 5 minutes. Hence the wake up of the control circuitry may start the timer. This may be advantageous because the weight determining means 55 preferably determines the weight of the beverage container 2 once dispensing has finished, which may take few seconds. Also, it may be desirable to store dispensing into two more more several glasses as one dispensing event, in order to reduce data handling in system 1.

The beverage dispensing station 50 may be further configured to establish a data connection and provide weight data or consumption data to the server 3 after waking up, preferably after a predetermined waiting time after waking up. The waiting time may be calculated from wake up of the control circuitry or from the determination by the weight determining means 55 and may be for example at least 10 seconds and even more preferably at least 1 minute and even more preferably at least 5 minutes. Hence wake up of the control circuitry or the determination of weight by the weight determining means may start the timer.

The weight data or beverage consumption data is preferably provided to the server 3 together with the identity of the beverage container 2. The weight data or beverage consumption data is preferably provided to the server 3 together with the identity of the dispensing station 50. The dispensing station 50 may be configured to activate the tag reader 10 and read the tag 9 of the beverage container 2 each time the control circuitry is woken up from sleep, each dispensing event or each time the weight is determined, or each communication session.

Figure 14:
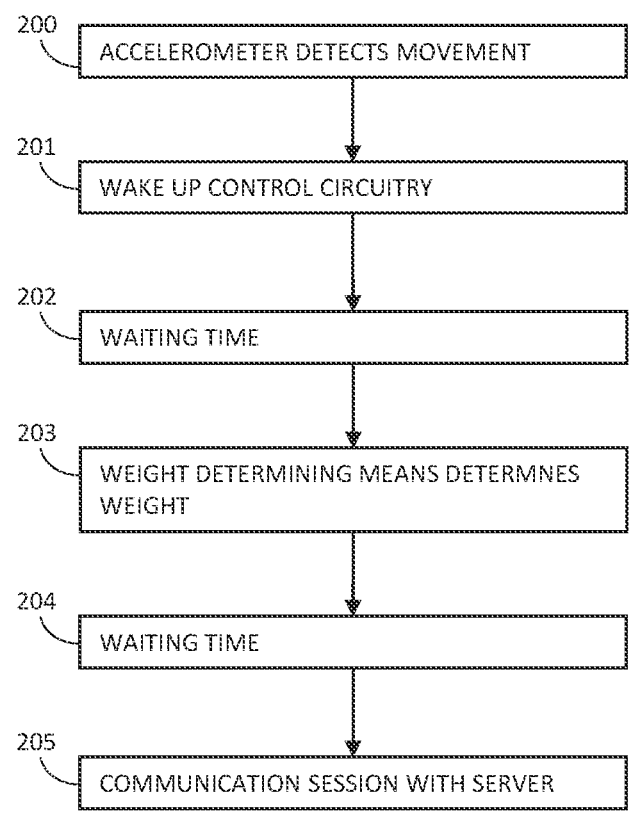

FIG. 14 shows a method involving a beverage dispensing station 50. It should be noted that the method shows a specific embodiment and that the steps of FIG. 14 may comprise various separate embodiments of the current disclosure, and that the various embodiments may be combined in any suitable manner. For example, the first and second waiting steps are separate embodiments. Furthermore, it should also be noted that that the tag reader 10 may be activated in any of steps 201 to 204 to read the tag 9 of the beverage container 2. The control circuitry may also carry out other checks of the circuitry of dispensing station 50 such as check battery status, detect temperature etc. in any of steps 201 to 204.

In optional step 201 the first sensor wakes up the control circuitry from sleep. The first sensor is preferably an accelerometer 56 that detects movement in step 200.

202 is an optional first waiting step that awaits completion of dispensing. As described herein, the control circuitry may have a timer. The predetermined time may be at least 10 seconds, more preferably at least 1 minute and even more preferably at least 5 minutes after dispensing has been detected or after wake up. A longer waiting time ensures that dispensing has finished and may also be used to catch dispensing made by a second person, which saves energy and computing power. However, it may be useful to have short waiting time to have more granularity in the dispensing data.

In step 203 the control circuitry activates the second sensor which preferably is weight determining means 55. The weight of the beverage container 2 is determined and stored and preferably beverage consumption is calculated and stored in memory 60. The weight or consumption data may be stored as a beverage dispensing event. The event may be stored together with a time point for dispensing. The second sensor may also be flow sensor, in which case the first waiting step 202 preferably is omitted.

Step 204 is an optional second waiting step. During step 204 any additional consumption events are stored in memory 60. The additional dispensing events may be detected, for example, by the accelerometer 56 again activating the weigh determination means 55. The waiting period is more preferably at least 10 seconds and even more preferably at least 1 minute and even more preferably at least 5 minutes.

In step 205 the control circuitry provides the beverage consumption data or weight data to the server 3. Hence any previously non-reported dispensing evens may be reported to server 3. Other data may be provided to the server 3 such as the identity of the beverage container 2, the identity of the dispensing station 50, or other sensor data. In the same session, other data may be transferred to the server 3 such as temperature, battery status, system ok message regarding beverage dispensing station, etc. The server 3 stores the data in the dataset 15. The beverage dispensing station 50 may also, in the communication session, receive information from server 3, such as activation of the dispensing prevention means 65, software updates etc. The wireless network interface 58 may be activated at this step or in a previous step, for example step in step 201.

The method of FIG. 14 may use one or both or none of the optional waiting steps. The wireless network interface 58 may be arranged to go to sleep after a certain time of inactivity.

The dispensing events are received by the server 3 and stored in the dataset 15.

The server 3 hence can keep track of consumption of beverage for example using a beverage consumption tracking module. A threshold stored in server 3 or in dispensing station 50 may be used to trigger the automatic delivery of a new beverage container 2 to the end-user of a certain dispensing station 50. The threshold for delivery may be determined based on shipping time and the speed of consumption. The speed of consumption may be calculated using dispensing events in dataset 15 for the dispensing station 50 or a plurality of dispensing stations 50. For example, the average consumption for a time period may be used.

The beverage dispensing station 50 may have a temperature sensor 59 for detecting the temperature of the beverage container 2 or ambient temperature in the vicinity of the beverage dispensing station 50. The temperature may be used for triggering delivery of a new container 2. A temperature tracking module stored in memory 60 of beverage dispensing station 50 or server 3 may track the temperature as detected by temperature sensor 59 and compare it to the temperature threshold. For example, if a beverage container 2 with beverage has been subject for high temperature for a time that is longer than a threshold time, this may trigger activation of the dispensing prevention means 65 or delivery of a new beverage container 2. A message may be sent to the mobile phone of an end user to prevent consumption of the beverage in the beverage container 2. Temperature data may be stored in memory 60 of the control circuitry. The dispensing station 50 may be configured to determine the temperature at least every predetermined time interval such as for example at least every hour, or at least every day. Temperature data may be stored in the memory 60 of the dispensing station 50, preferably together with a time point for detection. Temperature readings may also be triggered by a dispensing event, first sensor, accelerometer 56 or weight determining means 55.

The dispensing station 50 may have a dispensing prevention means 65. The dispensing prevention means 65 prevents, to some extent, the dispensing of beverage from the beverage container 2 currently supported or connected to the dispensing station 50. The beverage dispensing prevention means 65 is remotely controlled by server 3 via the control circuitry of the dispensing station 50.

The dispensing prevention means 65 may provide a warning signal to a user of the dispensing station 50. The warning signal may be of any type such as visible, audible or tactile signal. The warning signal may for example be a light on the exterior of the dispensing station, such as a LED 64. For example, a red light, or a flashing light.

In one embodiment the dispensing station 50 does not have dispensing prevention means 65. Instead, a message may be sent to a smart phone associated with a user of the dispensing station 50. The message may be that the content of the current beverage container 2 should not be consumed.

The dispensing prevention means 65 may also lock the dispensing station 50 such that beverage cannot dispensed from it, such as locking the tap 52. For example, when the tap 52 includes a handle 66 the handle 66 may be locked in a closed position. For example an electromagnetic actuator may be used to move a locking member from an unlocked position to a locked position, such that the handle 66 cannot be moved.

The dispensing prevention means 65 may be activated if the contents of a certain beverage container 2 is unsuitable for consumption, as detected manually or in an automatic manner by system 1. For example, a server user may know that certain batches of beverage have a non-pleasant taste or is contaminated in some manner. System 1 may be able to detect faulty containers 2 with any suitable method, for example the methods described herein with reference to the machine learning method shown in FIG. 17, temperature sensor 59, second tag 18 or error detection logic. For example, the fact that a that a non-authorized container is attached to the dispensing station, for example if the server 3 detects that that a beverage container identity received from a dispensing station 50 is not present in the dataset 15, or the fact that a second tag 18 (tampering device) indicates that a beverage container 2 has been tampered with.

Moreover, temperature data from dispensing station 50 may be used to determine that the contents of an individual beverage container 2 is unsuitable for consumption.

Temperature data from temperature sensor 59 may be reported to server 3 which may use the data to determine that a beverage container 2 should be flagged for non-consumption. For example, if the temperature detected by temperature sensor 59 has been above a threshold temperature for a certain threshold time.

Thus, one or a plurality of beverage containers 2 may be flagged for non-consumption in the dataset 15. This may be done manually or automatically as described above. The non-consumption flag may automatically trigger activation of dispensing prevention means 65 in the beverage dispensing stations 50 where flagged containers 2 are present.

Figure 15:
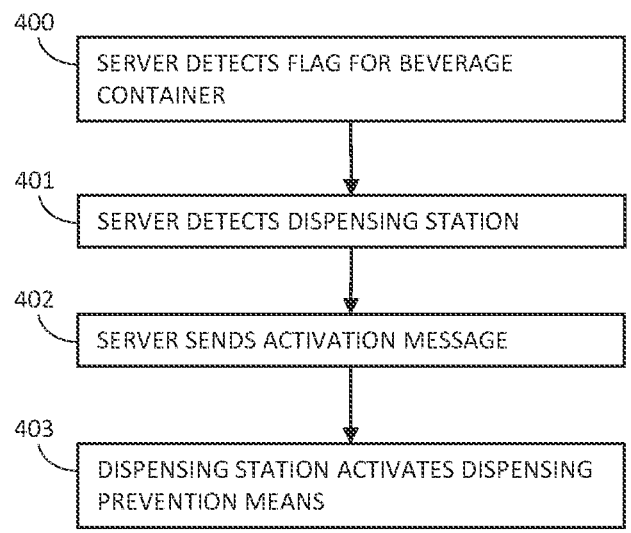

The flag in dataset 15 is detected by server 3 in step 400 of FIG. 15. For example, logic (dispensing prevention means activation module) at server 3 may repeatedly scan dataset 15 for flagged containers 2. The server 3 identifies, in the dataset 15, the dispensing station 50 where a flagged container 2 is currently in use (step 401). The server 3 then uses the wireless network interface 58 of the dispensing station 50 to provide an activation signal to the dispensing prevention means 65 of the dispensing station 50, (step 402) which then activates the dispensing prevention means 65 (step 403). The server 3 hence provides the activation signal via a network connection to the beverage dispensing module 50, which includes the wireless network interface 58 of the beverage dispensing station 50. The server 3 may have to wait for a communication event from dispensing station 50 in case the server 3 cannot be able to initiate communication with dispensing station 50.

As discussed above, the beverage container 2 has an identification tag 9 permanently attached to it. The permanent tag 9 is also referred to as "first tag 9" herein. The first tag 9 is preferably an RFID or NFC tag. The first tag 9 stores the identity of the beverage container 2.

In various embodiments, the beverage container 2 may have a second tag 18, which preferably is an RFID or an NFC tag. In a preferred embodiment both first tag 9 and second tags 18 are NFC tags. The second tag 18 is an antitampering device, arranged to detect if a beverage container 2 has been tampered with. Preferably each of the tags 9, 18 comprises at least one NFC antenna. Typically, the second tag 18 is disposable.

The second tag 18 has at least two states and can be attached to a beverage container 2 in such a manner that opening the opening 12 of the beverage container 2 puts the second tag 18 in the second state in a non-reversible manner. At least the first state can be detected by a tag reader 10. The second state can be a state where the second tag 18 cannot be detected by tag reader 10 or where the signal from second tag 18 is altered in some way in relation to the first state.

The second tag 18 is attached to the opening 12 of a filled beverage container 2 in such a manner that opening the opening 12 of beverage container 2 necessitates altering the state of the second tag 18 in a non-reversible manner. For example, removing the lid 13 necessitates putting the second tag 18 in the second state. The second tag 18 may for example have an antenna that breaks when the opening 12 is opened, for example when the lid 13 is removed. For example, the antenna is broken in two parts. For example, the second tag 18 may be in the form of a sticker with an NFC antenna that is placed across the lid 13 and a part of container 2 so that removing the lid 13 necessities breaking the NFC antenna (FIG. 3b).

Regarding the term "non-reversible" it should be noted that, in some cases, a highly skilled expert with access to the correct tools and equipment may be able to restore the second tag 18 to the first state, but it is still to be regarded as "non-reversible" because an average end user is not able to do that.

The second tag 18 may for example be in the form of a sticker or a loop. Part of the second tag 18 may be made from a polymer material into which an NFC antenna is integrated. An example of such a system is the Circus™ tamper loop provided by Avery Dennison. The second tag 18 may be of a type that is completely destroyed such that an NFC tag reader 10 does not receive any signal from the second tag 18. Or the second tag 18 may be of a type where the signal is altered but still present in the second state. This may be achieved by the second tag 18 having two antennas, one which is broken in the second state and one which is still functioning in the second state. This increases the reliability because the still-functioning antenna serves as a control that, for example, tag reader 10 works as intended.

The second tag 18 may store an identity of the second tag 18. The identity of the second tag 18 may be stored together with the identity of the beverage container 2 (first tag identity) in the dataset 15. Hence any tampering information will be associated to the identity of the beverage container 2. For example, when a beverage container 2 is delivered, it is useful to known that the container 2 was delivered in a non-tampered state, and that the specific container 2 is now connected to the beverage dispenser 50. This is particularly useful when a second tag 18 that is completely destroyed (quiet) in the second state because otherwise it is difficult to known that that a container 2 that was delivered in a non-tampered state to the end-user is now connected to the beverage dispenser 50. For machine learning-assisted tracking of beverage containers 2 it is also useful to know if a subset of containers (associated with a certain beverage filling station 4, for example) are tampered with.

Figure 16:
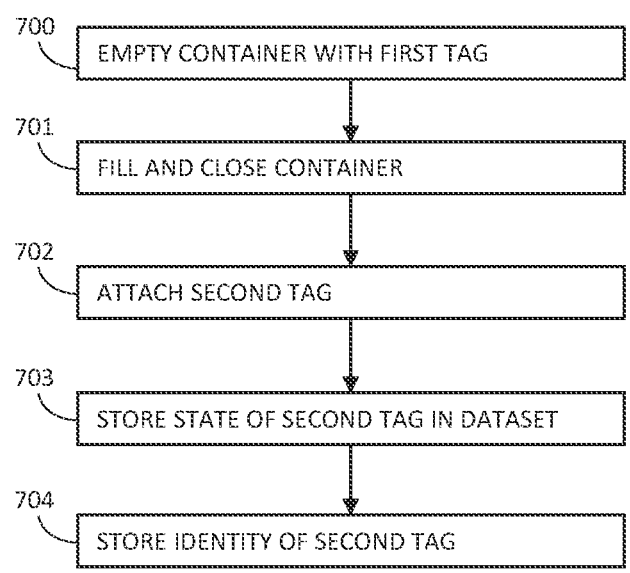

The second tag 18 may be applied to a container 2 with the use of the method shown in FIG. 16. In step 700 an empty beverage container 2 is provided. The beverage container 2 has an opening 12 that can be closed as described above. The beverage container 2 has a first tag 9 permanently attached, and the first tag 9 stores an identity of the beverage container 2. Preferably the container 2 is clean and the "washed" state. In step 701 the beverage container 2 is filled so that it contains at least some beverage. The container 2 is then closed, for example by attaching the lid 13. In step 702 the second tag 18, in the first state, is attached to the beverage container 2 in such a manner that opening the opening 12 of the beverage container 2 non-reversibly puts the second tag 18 in the second state. This is preferably done in a controlled environment so that no tampering occurs in between. In step 703 the state of the second tag 18, which typically is now in the first state, is stored in the dataset 15. The state is stored together with the identity of the first NFC tag 9, i.e. the identity of the beverage container 2. In step 704, which may be carried out before, after or simultaneously with step 703, an identity of the second tag 18 is stored, in the dataset 15, together with the identity of the beverage container 2. The beverage container 2 may then be shipped to end-users.

A tag reader 10, for example a portable tag reader 10 used by delivery service may be used to confirm that a non-tampered container is delivered to an end user. The tag reader 10 may provide this information to server 3 which stores the information in the dataset. This provides information that a non-tampered container 2 has been delivered to the end-user. Delivery may be confirmed by the end-user by various means such as signature, for example an electronic signature. If the second tag 18 is the second state, a new container 2 may be automatically shipped to the end user by server 3.

The end user may then install the container 2 at the dispensing station 50, such that the tag reader 10 of the dispensing station can read the first tag 9 and the second tag 18. The tag reader 10 of the dispensing station 50 may then read the identity of the first tag 9 and confirm that the second tag 18 is in the second state (or first state), and report this to the server 3. The tag reader 10 of the dispensing station 50 may read the second tag 18 and store the state in the memory 60 of the dispensing station 50. The tag reader 10 of dispensing station 50 may store the identity of the first tag 9 and the identity of the second tag 18 (if second tag 18 has an identity) and store these together with the state (first/second) in memory 60. If the second tag is not detected and the second tag 18 is of the type that is automatically destroyed by the tag reader 10, the dispensing station may store information that the second tag 18 is in the second state if no tag is detected. Hence, the tag reader 10 attempts to read second tag 18 but does not get a reply and thereby assumes that second tag 18 is in the second state.

The method may comprise the step, if a tampered container 2 has been delivered, to flag the container 2 for non-use in the dataset 15. Hence there may be logic in server 3 that that allows only containers 2 that have been delivered in a non-tempered state (in the first state) to be associated with dispensing station 50. If such a container 2 is present at a dispensing station 50 the server 3 will receive the identity as described elsewhere (for example with reference to FIG. 13), as a dispensing station 50 reports the identity of the beverage container 2 to the server.

If a server 3 detects that tampered container 2 is present at a dispensing station 50, the server 3 may be configured to take different actions. For example, the dispensing prevention means 65 may be activated. A message may be sent to the end-user about the tampering, for example that the end-user should not consume the contents.

Tag reader 10 of dispensing station 50 is preferably able to read the second tag 18 in the same manner as it can read the identification tag 9. For example, the embodiments shown in FIGS. 10-11 may be used for the second tag 18 as well as the first tag 9.

Server 3 may comprise or be in digital communication with machine learning service 20. Machine learning service 20 may apply machine learning to the dataset 15 to obtain a decision rule. Machine learning service 20 is able to detect patterns to produce a decision rule that is useful for managing the system 1, for example with regard to: a) demand for beverage, b) demand of logistics, i.e., distribution of beverage containers 2, c) errors or bottlenecks in system 1 or various components of system 1, e) determine end of life for beverage containers 2 and f) detecting beverage containers 2 that should not be consumed by an end-user. A user of server 3 may use machine learning to forecast behaviour of system 1 and their (sub)-users.

There are many possibilities. Here are a few hypothetical examples:
1. There is always a surge in beverage demand on Wednesdays. This can be used to increase production of filled beverage containers 2 beforehand.
2. Beverage containers keep breaking down at one certain filling station 4. This information can be used to visit this filling station 4 to take care of the problem.
3. A certain user pattern for beverage containers 2, for example number of filling cycles, length of transportation, or other parameter, makes them break earlier than other containers. Beverage containers 2 that fulfil these criteria, for example a number of filling cycles, or total length of transport, may be detected and taken out of use before they break.
4. One individual beverage container 2 departs from a pattern. This may indicate that the container 2 has been tampered with or is a fake container, provided by a non-authorized source. For example, a fake container ID has been created or the ID of a "true" container 2 has been cloned and the container 2 has then been inserted in the system 1, for example been attached to a beverage dispenser 50. Hence, the decision rule may also be used for detecting fraudulent behaviour.

Parameters that may be useful and to be included in the data set 15 include: number of filling cycles, length of transportation, length of time that container 2 spends at an end-user, date of manufacture of beverage container 2, production batch number of beverage container 2, time spent in storage, data from sensors (such as weight determining means 55, temperature sensor 59 or accelerometer 56) of dispensing stations 50, manually or automatic recorded errors or failures of containers 2 and dispensing stations 50, means of transportation and combinations of these. Any data in dataset 15 may be used. Information for machine learning may also be provided from external information providers, for example information about weather, temperature at end-users, or during transport or during storage, humidity etc. These are just non-limiting examples, as there are many possibilities.

In particular machine learning may be used to determine a statistical model and to detect a behaviour of an individual beverage container 2 that departs from the statistical model. This may indicate that the beverage container 2 has been tampered with, that the identity of the beverage container 2 is fake, or that an identity of a beverage container 2 has been cloned or stolen.

The following are hypothetical examples used to illustrate how machine learning may be used to identify strange behaving beverage containers 2:

Abnormal shipping speeds for beverage container 2 to dispensing station 50 (too short times may indicate multiple IDS, too long time may indicate that the beverage dispenser has been tampered with)

Beverage container 2 is absent from system for a prolonged time (may indicate tampering)

Abnormal accelerometer data (may indicate tampering)

However, it should be kept in mind that the decision rule may be considered as a "black box" and it is difficult and may be not even meaningful to speculate in which parameters are predictive for indicating tampering or other faults in beverage containers 2. Machine learning predictions are improved when the dataset 15 comprises information about a large number of beverage containers 2 that have been accumulated over time (training data set). Machine learning is improved when the containers 2 are similar or identical, or at least comparable. The same is true of filling stations 4 or dispensing stations 50. Machine learning may be provided from a machine learning service 20 such as Amazon or may be provided in the server 3. Any useful type of machine learning may be used, such as for example machine learning implementing Bayes' theorem. Guidance can be found in US2014/0012784, US2008/0059120 and U.S. Pat. No. 8,819,498.

Applying machine learning may result in a statistical model for behaviour for the plurality of beverage containers. The decision rule may be that any container 2 that departs from the behaviour should be taken out of service. The decision rule may be that any container 2 that departs from the statistical more than allowed should be taken out of service. There may be a threshold for how much a container 2 may depart from the statistical model before being taken out of service. The threshold may be predetermined or the threshold may be determined by a server user. Binary classification may be used to classify beverage containers 2 that should be taken out of service vs beverage container 2 that should not be taken out of service.

Figure 17:
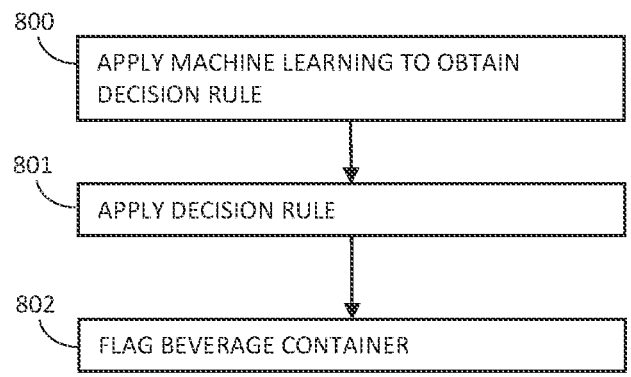

With reference to FIG. 17 a method may comprise the steps of step 800: applying machine learning to the dataset 15 to obtain a decision rule. The decision rule can be updated by applying machine learning at any useful interval, such as for example daily, weekly or monthly. Hence in step 800 the dataset 15 is used as a training data set to obtain the decision rule. In step 801 the decision rule is applied to the dataset 15. This is also carried out at any suitable time interval but typically more often than the decision rule is updated, such as hourly or daily. The decision rule may be applied to a part of dataset 15. For example, machine learning may be applied on data for beverage containers 2 that has been taken out of use whereas the decision rule is applied to beverage containers 2 that are currently in service only. The dataset 15 is typically updated often, preferably in real time. So, the dataset 15 will change over time. In step 802 a decision is taken. It may be a decision with regard to an individual beverage container 2, for example that a certain beverage container 2 should be taken out of service, or that the contents of the beverage container 2 should not be consumed. An individual container 2 may be flagged in the dataset for taking out of service. This may trigger manual alarm at the server 3 to a server user. This may also trigger activation of the dispensing prevention means 65. Hence, in one embodiment, the beverage dispensing station has a dispensing prevention means 65, and the server 3 is configured to, activate the dispensing prevention means 65 when a beverage container 2 is flagged for taking out service.

In some embodiments a method may comprise making a decision about taking an individual beverage container 2 out of service by providing data associated with the beverage container 2 to a decision rule comprising a statistical model, where the statistical model has been obtained by a) receiving a training dataset comprising data for beverage containers 2 that comprises information about a large number of beverage containers 2 that have been accumulated over time, where the data set includes beverage containers 2 that has been taken out of use and b) applying machine learning to the dataset to produce a decision rule that comprises a statistical model.

The training data set may include information about a large number of beverage containers 2 that has been taken out of use within a predetermined time of use (for example broken down beverage containers 2) or a large number of beverage containers 2 that has not been taken out of use within the predetermined time limit, or both. The decision rule may be used to identify beverage containers that are currently in use but has high similarity with either beverage containers 2 that were taken out of use before the predetermined time or containers 2 that were still in use after the predetermined time or both.

Machine learning may be used to produce a statistical model that describes how beverage containers 2 typically behave in the system 1, for example with regard to shipping speed, and any beverage container that departs from the statistical model may be flagged to be taken out of use. This could for example be used to identify a beverage container that has been tampered with in some manner.

The decision rule may be stored in machine learning service 20. Server 3 may comprise one or more of the following software components that uses the decision rule in machine learning service 20: beverage container tracking module and container error flagging module. For example, container tracking module may provide data associated with an individual beverage container 2 to the decision rule. If the decision rule logic takes a decision regarding an individual beverage container 2 to take it out of service, information about this is provided from the decision rule logic to the container error flagging module that flags the individual container 2 for taking it out of service. In the same manner machine learning may be applied to the dataset 15 to predict errors of beverage dispensing stations 50.

System 1 may comprise one or more beverage fillings stations 4 for filling beverage containers with beverage. The beverage filling station 4 may for example be located in a suitable building. However, in certain embodiments, beverage filling station 4 may wholly or partly be located in a filling station container 21. This provides for fast expansion of the system, where one or more filling station containers 21 fitted with filling stations 4 are deployed.

The filling station 4 may comprise a beverage production unit. The beverage production unit may be computer controlled such that a computer 19 controls tanks, dispensers, valves, pumps, heaters, and coolers in a predetermined sequence to provide an automatic brewing or beverage production process. Computer 19 may also control a cleaning process when the beverage has been prepared or on a predetermined schedule (Clean-in-place).

The beverage production unit may be adapted to provide any type of beverage such as potable water, beer or soda, or cider. In one preferred embodiment the beverage is beer. In one preferred embodiment the beverage is potable water.

The beverage production unit may comprise water purification unit 5. The water purification unit 5 may use any suitable technology such as filters, heating, UV irradiation or addition of chemicals such as chlorine. The beverage production unit may also comprise a desalination unit for removing salt from the water.

The beverage production unit may also provide a unit for adding various ingredients such as flavouring, such as syrup for providing a soda, and carbon dioxide. Beverage may be produced continuously or in a batch process and stored in tank 6.

Beverage production unit preferably has at least one sensor for sensing for example, flow, temperature, pressure, or level in the beverage production unit. In general, the sensor may be able to provide data to computer 19 and to server 3. Sensor data and production data may be stored in dataset 15. Computer 19 of beverage filling station 4 may be connected to a data network communication device which enables data communication with server 3. Computer 19 may also comprise memory, processor and bus. Computer 19 is preferably connected to tag reader 10 of beverage filling station 4.

The memory of computer 19 of the beverage filling station 4 may have at least one set of instructions in digital form for producing a beverage. The computer 19 may have access to a plurality of instructions, one for each type of beverage, such as different types of beer. The digital instructions (recipes) may be provided from server 3 to computer 19. Computer 19 may have a user interface, which a user may use to, for example, start or stop brewing procedures. The user interface may comprise a display and input means, such as a keyboard, a mouse, joystick, touchscreen, or the like. Alternatively, a user of beverage filling station 4 may be able to use a mobile phone as interface for example by connecting to computer 19 via server 3 or directly connecting to computer 19.

Computer 19 may be able to receive an order from server 3 to produce beverage, for example if server 3 detects or predicts a demand for beverage. Hence computer 19 may be able to activate the beverage production unit, for example to produce beer or potable water.

In a preferred embodiment the beverage filling station 4 is arranged such that a tag reader 10 is arranged in relation to the washing station 7 to detect the tag 9 of a beverage container 2 only when the beverage container 2 has passed through the washing station 7. For example, the tag reader 10 is placed in close proximity to the exit of the washing station 7. This provides automatic tracking of washed containers 2 and makes sure that only washed containers 2 are flagged with the "washed" state.

Figure 18:
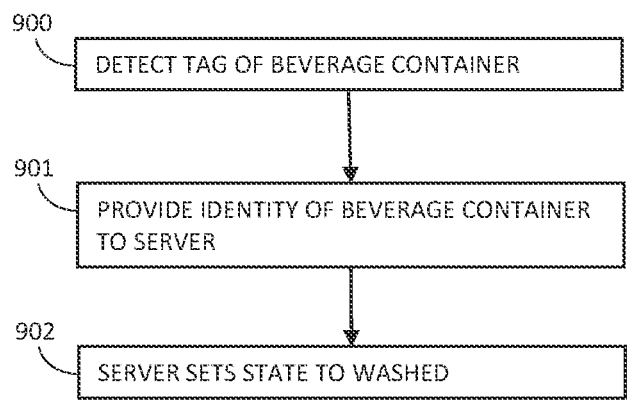

With reference to FIG. 18 the method may comprise the steps of 900, detecting the beverage container 2, step 901 the tag reader 10 providing the identity of the beverage container 2 to the server 3. This is done via computer 19 which is in network communication with server 3. In step 902 the server 3 sets the state of the beverage container 2 to "washed" in the dataset 15. The server 3 may set the state to "washed" because the tag reader 10 is associated with this state at sever 3 such that an identity of the tag reader 10 is associated with the washed state in the dataset 15. Or, the ability to set the washed state is stored with the tag reader 10, which provides a washed state message to the server 3 together with the identity of the beverage container 2.

Similar rules may be applied anywhere in the system where they are useful and may for example involve two or more tag readers 10.

In an even more preferred embodiment, system 1, in particular filling station 4 provides at least three tag readers 10: one that provides an "unwashed" state (or "entered station" state), one that provides "washed" state, and one that provides a third state that may be "filled/ready to deliver" state.

As mentioned, server 3 may have logic that detects errors such as erroneous transfer from "unwashed" state to the "filled" state without passing "washed" state. When an error has occurred, an individual beverage container 2 may be flagged in dataset 15 to be taken out of service or to be reprocessed, for example to be taken back to beverage filling station 4 to be washed and filled again. Also, beverage dispensing prevention means 65 of dispensing station 50 may be activated if the containers 2 somehow is delivered to a dispensing station 50.

The filling station 4 may be contained in a filling station container 21. The filling station container 21 is preferably of a size such that the beverage filling station 4 can be transported using a truck or trailer, or similar. Hence the filling station container 21 may be movable. For example, it may have the dimensions of a prefabricated shipping container. The filling station container 21 may have the dimensions of a standard intermodal shipping container. Standard ISO shipping containers are 8 ft (2.43 m) wide, 8.5 ft (2.59 m) high and come in two lengths; 20 ft (6.06 m) and 40 ft (12.2 m). The filling station container 21 may be made of steel or other strong material such as aluminium, glass fibre, plastic, plywood, or similar material. The filling station container 21 is preferably self-supporting. Filling station container 21 may have any suitable shape where a rectangular block shape or approximately such a shape is preferred. The rectangular block may have dimension that are approximately: height 2-3 m, width 2-3 m and length 3-12 m. It may be possible for a user to enter into the filling station container 21, for example by walking into the filling station container, in order to service the beverage preparation unit or to make input into computer 19.

The filling station container 21 may be adapted to be placed on the ground or on a floor. The filling station container 21 may have an essentially flat underside for placing the filling station container 21 on flat ground or on a floor, but filing station container 21 may be provided with feet or rails for placing on an uneven surface.

Filling station container 21 may have a suitable arrangement for lifting the filling station container 21 by a crane or otherwise moving the filling station container 21 Hence, the filling station container 21 can be transported to the intended location and easily become connected and provide beverage in a short time.

Filling station container 21 is preferably suitable for being placed outdoors. Hence the filling station container 21 may have suitable proofing against one or more of the following: heat, cold temperatures, rain, lightning, snow or strong winds, in order to protect the various components of the filling station container 21 or provide a controlled environment for beverage production. The walls (including roof and bottom) of filling station container 21 may have thermal insulation. The walls may be rainproof and windproof. The bottom of the filling station container 21 is suitable for being placed on the ground and may be proofed against rain and water seepage. The walls of the filling station container 21 may have a total thickness, including insulation, of at least 2, cm more preferably at least 4 cm and most preferably at least 6 cm. In one embodiment the filling station container 21 is a regular intermodal shipping container provided with internal thermal insulation. Filling station container 21 may be provided with arrangements for proving a controlled temperature and humidity inside the filling station container 21, such as a heater, cooler, air conditioner, humidifier or dehumidifier. The computer may be arranged to control the internal conditions of filling station container 21 and keep for example temperature or humidity within a predetermined range.

A tag reader 10 may be arranged to detect that a beverage container 2 has entered the beverage filling station 4, in particular entered the beverage filling station container 21.

The filling station container 21 is preferably connectable to external power supply, a water supply and sewage and may preferably be provided with suitable pipes and wiring to enable easy connectivity. Walls of filling station container 21 may have suitable bushings for various connections or ports for various utilities such as electricity, water, sewage and data communication. The filling station container 21 may have a pump for providing suction from a water source such as, the sea or a lake or a river to provide water. Walls of filling station container 21 may have suitable bushings for various connections or ports for various utilities such as electricity, water, sewage, and data communication.

The beverage filling station container 21 is preferably connectable to external power supply, a water supply and sewage and may preferably be provided with suitable pipes and wiring to enable easy connectivity.

Filling station container 21 may in particular comprise water purification unit 5, beverage production unit, beverage tank 6, one or more tag readers 10, computer 19 and washing station 7.

It is understood that the present methods, systems and devices are partly computer-implemented, using digital computer equipment. The various embodiments and components described herein such as server 3, beverage dispensing station 50, tag reader 10, filling station 4, computer 19, machine learning service 20, mobile phone and communication between these components uses digital computer technology for storing and handling digital information and signals as well as suitable hardware and software, including for example suitable digital processors, digital memories, input means, output means, buses and communications interfaces. A user may be able to make input using for example a keyboard, a mouse or a touch screen. Output may be provided on for example a display.

Figure 19:
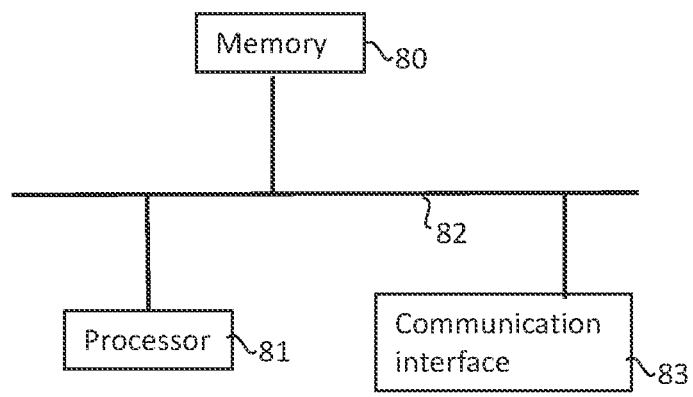
FIG. 19 is a schematic drawing of control circuitry.

The various components, such as server 3 and computer 19 may each have an operating system. The server 3 may have a user interface that a server user can use to add new beverage containers 2, analyse data etc. With reference to FIG. 19 each of tag reader 10, server 3, computer 19, mobile phone, and machine learning service 20 may comprise control circuitry comprising a memory 80, a processor 81 a bus 82 and a communication interface 83. Each of tag reader 10, server 3 and machine learning service 20 and beverage dispensing station 50 may have suitable hardware and software for communication over a data network such as the internet.

Server 3 may be one physical server or may be a virtual server. Function of sever 3 may hence be distributed across several physical entities. Data, such as dataset of dataset 15 may be stored in a datastore a shown in FIG. 1, or in server 3. Dataset 15 may be stored in a distributed database comprising several nodes.

The methods herein can be implemented any suitable combination of software and hardware. Any suitable programming language may be used for the software units and methods described. Data communication in system 1 may be implemented using suitable networking technologies and protocols, inducing cellular communication such as 3G, 4G and 5G, LoRa, Wi-Fi or Bluetooth, or Ethernet. Data communication can be wireless or wire bound. Information may be exchanged over a wide area net such as internet 17. Data communication in system 1 may be encrypted. Wireless communication in system 1 may be carried out with appropriate transmitters and receivers. Tag reader 10 may have appropriate transmitters and receivers for detecting an NFC or RFID tag.

The identity of the each of the beverage containers 2 and the dispensing stations 50 may comprise any suitable combination of numbers, letters or other symbols suitable for digital data processing. Each of filling station 4 in system 1 may also have an identity.

Communication in system 1 and update of dataset 15 may be carried out using any suitable schedule. Tag readers 10 and dispensing station 50 may provide information to rest of system 1 in particular sever 3, for example immediately when a beverage container 2 is detected by tag reader 10 or when a sensor of dispensing station 50 detects a value. Communication sessions may alternatively be scheduled to be carried out at a suitable interval, for example at least every predetermined interval such as at least every second, at least every minute, at least every hour or every day It is realized that everything which has been described in connection to one embodiment is fully applicable to other embodiments, as compatible. Hence, the invention is not limited to the described embodiments, but can be varied within the scope of the enclosed claims. While the invention has been described with reference to specific exemplary embodiments, the description is in general only intended to illustrate the inventive concept and should not be taken as limiting the scope of the invention. The invention is generally defined by the claims.

The invention may be claimed as set out in the following additional aspects as follows:

In a further aspect of the invention there is provided a beverage distribution system comprising: a plurality of beverage containers where each of the beverage containers are reusable and portable and where each of the plurality of beverage containers comprises an identity tag with a unique identity, a plurality of beverage dispensing stations adapted to mechanically connect to the beverage container such that beverage can be dispensed from the beverage container while being mechanically connected to the beverage dispensing station, a server having stored, in a dataset, an identity of each of the plurality of beverage containers, said beverage dispensing stations each comprising an accelerometer, said beverage dispensing station further comprising an identity tag reader, a wireless network interface, and control circuitry, the dispensing station being configured to, when the accelerometer detects movement, to activate the tag reader to read the identity tag of a beverage container, and configured to use the wireless network interface to provide the identity of the beverage container to the server, the server being configured to receive the identity of the beverage container and store the identity of the beverage container in the dataset.

The use of an accelerometer in the beverage dispensing station has many purposes. For example, it may detect when a user has switched the beverage container. That is a suitable time to report the identity of the beverage container. That keeps the server updated while keeping data transmission and power use to a minimum in the beverage dispensing station.

The identity of the beverage container is provided together with at least one of: beverage consumption data or weight data, a temperature reading, battery status or accelerometer data. This data may be used to provide a safer and better experience to the user, as described herein.

In a further aspect of the invention there is a beverage dispensing station adapted to mechanically connect to a beverage container such that beverage can be dispensed from said beverage container, the beverage dispensing station comprising an identity tag reader, a wireless network interface and an accelerometer, the beverage dispensing station further comprising control circuitry comprising a memory, where the beverage dispensing station is configured to, when the accelerometer detects movement, read an identity tag of a beverage container presently connected to the dispensing station, and store it in the memory of the control circuitry.

When the number has been stored in the memory, the beverage dispensing may choose to transmit the identity or not. For example, if there is a new beverage container identity the beverage dispensing station may transmit the identity to the server. If the identity is the same as before, the beverage dispensing may take no action.

The beverage dispensing station may be configured to use the wireless network interface to connect to a server and provide the identity of the beverage container to the server.

The beverage dispensing station may be configured to provide accelerometer data provided to a server. This may be used to detect tampering or if the beverage dispensing station has been damaged, for example fallen to the floor.

The control circuitry of the beverage dispensing station may have a wake state and a sleep state and the beverage dispenser is configured such that movement detection by the accelerometer wakes up the control circuitry from the sleep state. This saves power in the beverage dispensing station. The accelerometer may also to activate the wireless network interface.

The beverage dispensing station may have weight determining means that are activated by movement detection by the accelerometer. Weight determining means may be used for determining beverage consumption and provide beverage consumption data to the server. Weight determining means may not be able to wake up control circuitry from sleep.

In a further aspect of the invention there is provided a method involving a system, the system comprising a plurality of beverage containers where each of the beverage containers are reusable and portable and where each of the plurality of beverage containers comprises an identity tag with a unique identity,
- a plurality of beverage dispensing stations adapted to mechanically connect to a beverage container such that beverage can be dispensed from the beverage container,
- a server having stored, in a dataset, an identity of each of the plurality of beverage containers, said beverage dispensing stations each comprising an accelerometer, said beverage dispensing stations further comprising an identity tag reader, a wireless network interface, and control circuitry, the method comprising the steps of the accelerometer detecting movement, thereby activating the tag reader to read the identity tag of a beverage container, then
- the beverage dispensing station using the wireless network interface to provide the identity of the beverage container to the server, then
- the server receiving the identity of the beverage container and storing the identity of the beverage container in the dataset.

In one embodiment the beverage dispensing station has weight determining means and where a weight determination step is carried out before step b), the step comprising: using weigh determining means of the beverage dispensing station to determine the weight of a beverage container presently supported by the dispensing station, where the weight data or beverage consumption data is provided to the server in step b).

In a further aspect of the invention there is provide a beverage container, said beverage container being reusable and portable, said container having an opening that can be closed, the beverage container containing beverage and having two near communication field (NFC) tags,
said two NFC tags being:
- a first NFC tag permanently attached to the beverage container and storing an identity of the beverage container, and
- a second NFC tag which has at least two states, said second NFC tag being in the first state and attached to the beverage container in such a manner that opening the opening of the beverage container puts the second NFC tag in the second state in a non-reversible manner.

The first tag provides traceability of the container in the system. The second tag ensures that a container that has been delivered to a user has not been tampered with. This provides additional safety to a user of the beverage container.

The second tag may store a second identity. The second tag may be disposable.

In a further aspect of the invention there is provided a method comprising
- a) providing an empty beverage container, said beverage container being reusable and portable, where the beverage container has an opening that can be closed and where the beverage container has a first NFC tag permanently attached to the beverage container and where the first NFC tag stores an identity of the beverage container,
- b) filling beverage in the container, so that there is at least some beverage in the container, and closing the opening of the container,
- c) attaching, to the container, a second NFC tag which has at least two states said second NFC tag being in the first state and attached to the beverage container in such a manner that opening the opening of the beverage container non-reversibly puts the second NFC tag in the second state.

The method may additionally involve a digitally stored dataset comprising the identities of a plurality of beverage containers and where the method additionally comprises the step d), carried out after step c), of storing, in the dataset, the state of the second NFC tag of the beverage container, together with the identity of the first NFC tag.

The second NFC tag may store a second identity, and the method may comprise the step of storing, in the dataset, the identity of the second NFC tag with the identity of the first NFC tag.

The connection in the dataset provides traceability of the containers in the system. For example, it is useful to know where a tampered container has been.

When the dataset is stored by a server, the method may further involve a beverage dispensing station being adapted to mechanically connect to the beverage container such that beverage can be dispensed from said beverage container, the beverage dispensing station comprising an identification tag reader, the beverage dispensing station comprising a wireless network interface for communication with the server, the method further comprising the steps of
- d) the tag reader of the dispensing station reading the first tag of a beverage container, and the tag reader of the dispensing station reading or attempting to read the state of the second tag,
- e) the beverage dispensing station providing the identity of the beverage container and the state of the second tag to the server, then
- f) the server storing the identity of the beverage container event in the dataset, associated with the identity of the dispensing station.

In a further aspect of the invention there is provided a system comprising a plurality of beverage containers according to the above aspect of the invention, and a server having stored, in a dataset, the identity of each of the plurality of beverage containers, where the state of each of the second tags is stored in the dataset and is associated with the identity of the beverage container.

The connection in the dataset provides traceability of the containers in the system. For example, it is useful to know where a tampered container has been.

The system may additionally comprise a tag reader. The system may additionally comprise a beverage dispensing station being configured to connect to the beverage container such that beverage can be dispensed from said container, the beverage dispensing station comprising a tag reader.

In a further aspect of the invention there is provided a beverage distribution system comprising:
- a beverage filling station being configured to fill beverage containers with beverage, said beverage filling station comprising at least one identification tag reader,
- a plurality of beverage containers which are reusable and portable, where each of the
- plurality of beverage containers carries a unique identification tag,
- a server connected to the identification tag reader, said server being configured to store, in
- a dataset, a state of a reusable beverage container using information from the tag reader and the identification tag.

The system provides aggregation of information regarding the beverage containers and centralized control over the containers. This increases safety.

The beverage filling station may a washing station where the identification tag reader is arranged in the washing station such that only the identification tag of beverage containers that have gone through the washing station are read by the identification tag reader. The beverage filling station may be able to produce beverage.

It is important to keep track of which beverage containers that are washed, and which are not washed.

The system may comprise a plurality of beverage filling stations, where each filling station provides data to the dataset, and where each beverage container is logically associated with a certain beverage filling station in the dataset.

At least one identification tag reader of the system is configured to register a state a reusable container selected from
- a) the container has entered the beverage filling station,
- b) the container has been washed in the beverage filling station,
- c) the container has been filled with beverage in the beverage filling station,
- d) the container has left the beverage filling station.

In a further aspect of the invention there is provided a method in beverage distribution system said beverage distribution system comprising
- a beverage filling station being configured to fill reusable beverage containers with beverage, said beverage filling station comprising at least one identification tag reader,
- a plurality of beverage containers, said beverage containers being reusable and portable, where each of the plurality of beverage containers carries a unique identification tag,
- a server connected to the identification tag reader, said server being configured to store, in a digitally stored dataset, a state of a reusable beverage container using the identification tag, where the beverage filling station comprises a washing station where the identification tag reader is arranged in the washing station such that only the identification tag of beverage containers that have gone through the washing station are read by the identification tag reader, the method comprising the steps of
  - a) the tag reader reading the identification tag on an individual beverage container,
  - b) the tag reader providing the identity of the beverage container to the server,
  - c) the server storing, information that the individual beverage container has been washed.

The invention claimed is:

1. A system comprising:
   a plurality of portable beverage containers where each of the plurality of beverage containers carries a unique identification tag,
   the system further comprising:
   a plurality of beverage dispensing stations adapted to support one of the beverage containers, and connect to the beverage container such that beverage can be dispensed from the container, said beverage dispensing stations comprising an identity tag reader configured to read the identity tag of a beverage container that is supported by or mechanically connected to the dispensing station, said beverage dispensing stations further comprising a wireless network interface,
   where the beverage dispensing stations has dispensing prevention means which prevents a user from dispensing beverage from the dispenser,
   the system further comprising a server in communication with the beverage dispensing stations, said server having stored a dataset comprising the identities of each of the plurality of beverage containers, said beverage containers being authorized containers, the server being configured to:
   a) detect a flag for activation of the dispensing prevention means for a certain beverage container in the dataset, said flag being caused by the detection of a non-authorized beverage container being attached to a beverage dispensing station,
   b) identify, in the dataset, the dispensing station which is associated with the beverage container that is flagged,
   c) provide a signal to the dispensing station identified in step b) to activate the dispensing prevention means.

2. The system of claim 1 where the detection of a non-authorized container takes place by detecting a) that that a beverage container identity received from a dispensing station is not present in the dataset or b) detecting a cloned beverage container identity.

3. The system of claim 1 where the detection of a non-authorized container takes place by detecting that that a beverage container identity received from a dispensing station is not present in the dataset.

4. The system of claim 1 where the detection of a non-authorized container takes place by detecting a cloned beverage container identity.

5. The system of claim 1 where the dispensing prevention means is an optical or sound warning signal to the user.

6. The system of claim 1 where the dispensing prevention means blocks dispensing of beverage from the dispensing station.

7. The system of claim 6 where the dispensing station has a tap, and the dispensing prevention means locks the tap.

8. The system of claim 1 where the identification tag is a Near Field Identification (NFC) tag.

9. The system of claim 1 where the beverage containers are reusable.

10. A method involving a system, the system comprising:
    a plurality of portable beverage containers where each of the plurality of beverage containers carries a unique identification tag,
    the system further comprising:
    a plurality of beverage dispensing stations adapted to support one of the beverage containers, and connect to the beverage container such that beverage can be dispensed from the container, said beverage dispensing stations comprising an identity tag reader configured to read the identity tag of a container that is supported by or mechanically connected to the dispensing station, said beverage dispensing stations further comprising a wireless network interface, the system further comprising a server in communication with the beverage dispensing stations, said server having stored a dataset comprising the identities of each of the plurality of beverage containers, said beverage containers being authorized containers, where the beverage dispensing station has dispensing prevention means which prevents a user from dispensing beverage from the dispenser, the method comprising the steps:
a) the server detecting a flag for activation of the dispensing prevention means for a certain beverage container in the dataset, said flag being caused by the detection of a non-authorized beverage container being attached to a beverage dispensing station,
b) the server identifying, in the dataset, the dispensing station which is associated with the beverage container that is flagged,
c) the server providing a signal to the dispensing station identified in step b) to activate the dispensing prevention means, and
d) the dispensing station activating the dispensing prevention means.

11. The method of claim 10 where the detection of a non-authorized container takes place by detecting a) that that a beverage container identity received from a dispensing station is not present in the dataset or b) detecting a cloned beverage container identity.

12. The method of claim 10 where the detection of a non-authorized container takes place by a) detecting that that a beverage container identity received from a dispensing station is not present in the dataset.

13. The method of claim 10 where the detection of a non-authorized container takes place by detecting a cloned beverage container identity.

* * * * *